(12) United States Patent
Tracy et al.

(10) Patent No.: US 10,071,841 B2
(45) Date of Patent: Sep. 11, 2018

(54) SCORED PACKAGE

(71) Applicant: BEMIS COMPANY, INC., Neenah, WI (US)

(72) Inventors: Jordan R. Tracy, Appleton, WI (US); Jay D. Hodson, Hortonville, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 14/902,036

(22) PCT Filed: Jul. 3, 2013

(86) PCT No.: PCT/US2013/049260
§ 371 (c)(1),
(2) Date: Dec. 30, 2015

(87) PCT Pub. No.: WO2015/002651
PCT Pub. Date: Jan. 8, 2015

(65) Prior Publication Data
US 2016/0137377 A1    May 19, 2016

(51) Int. Cl.
| | |
|---|---|
| *B65D 33/00* | (2006.01) |
| *B65D 75/58* | (2006.01) |
| *B32B 3/26* | (2006.01) |
| *B65D 75/00* | (2006.01) |
| *B65D 75/30* | (2006.01) |

(52) U.S. Cl.
CPC ............ *B65D 75/5827* (2013.01); *B32B 3/26* (2013.01); *B65D 75/008* (2013.01); *B65D 75/30* (2013.01); *B65D 75/5866* (2013.01); *B32B 2307/582* (2013.01); *B32B 2439/46* (2013.01)

(58) Field of Classification Search
CPC ............ B65D 75/5833; B65D 75/5827; B65D 75/008; B65D 75/30; B65D 75/5866
USPC .................... 383/207–211, 66, 906
See application file for complete search history.

(56) References Cited

U.S. PATENT DOCUMENTS

| | | | |
|---|---|---|---|
| 2,936,940 | A | 5/1960 | Berghgracht |
| 3,380,646 | A | 4/1968 | Doyen et al. |
| 3,438,567 | A | 4/1969 | Bell, Jr. |
| 4,116,338 | A | 9/1978 | Weichselbaum |

(Continued)

FOREIGN PATENT DOCUMENTS

| | | |
|---|---|---|
| CA | 2270572 A1 * | 4/1999 |
| CA | 2270572 A1 | 11/1999 |

(Continued)

*Primary Examiner* — Jes F Pascua
(74) *Attorney, Agent, or Firm* — Amy L. De Coster

(57) ABSTRACT

A scored package is described. The first panel of the package comprises a multilayer film with an exterior layer having a nonlinear first score Sine and an interior layer having a linear second score line. The first score line and the second score fine are positioned non-parallel in a plane of the package such that the first score line intersects the second score line to form an opening in the package at the second score line when the exterior layer and the interior layer are separated. Separation of the exterior layer and the interior layer also forms an adhesive-free pour spout in the separated exterior layer. Various embodiments of various package configurations, score line configurations, multilayer film structures and methods of manufacturing are also described.

24 Claims, 15 Drawing Sheets

(56) References Cited

U.S. PATENT DOCUMENTS

| | | | |
|---|---|---|---|
| 4,260,061 A * | 4/1981 | Jacobs | B65D 75/5833 383/203 |
| 4,345,393 A | 8/1982 | Price et al. | |
| 4,512,136 A | 4/1985 | Christine | |
| 4,613,046 A * | 9/1986 | Kuchenbecker | B65D 5/541 229/208 |
| 4,622,799 A | 11/1986 | Boston | |
| 4,785,940 A | 11/1988 | Wilson | |
| 5,044,776 A | 9/1991 | Schramer et al. | |
| 5,079,059 A | 1/1992 | Wyslotsky | |
| 5,158,499 A | 10/1992 | Guckenberger | |
| 5,229,180 A | 7/1993 | Littmann | |
| 5,630,308 A | 5/1997 | Guckenberger | |
| 5,934,809 A | 8/1999 | Marbler | |
| 5,945,145 A | 8/1999 | Narsutis et al. | |
| 6,060,096 A | 5/2000 | Hanson | |
| 6,173,554 B1 | 1/2001 | Marbler | |
| 6,270,871 B1 | 8/2001 | Scholz et al. | |
| 6,306,448 B1 | 10/2001 | Martuch et al. | |
| 6,383,592 B1 | 5/2002 | Lowry et al. | |
| 6,517,243 B2 | 2/2003 | Huffer et al. | |
| 6,554,134 B1 * | 4/2003 | Guibert | B65D 75/5838 206/494 |
| 6,589,622 B1 | 7/2003 | Scott | |
| 6,681,934 B2 | 1/2004 | Kolterjohn et al. | |
| 6,746,743 B2 | 6/2004 | Knoerzer et al. | |
| 6,913,388 B2 | 7/2005 | Laske | |
| 7,021,827 B2 | 4/2006 | Compton et al. | |
| 7,189,300 B2 | 3/2007 | Knoerzer et al. | |
| 7,306,370 B2 | 12/2007 | Howell et al. | |
| 7,334,682 B2 | 2/2008 | Goepfert | |
| 7,416,768 B2 | 8/2008 | Knoerzer et al. | |
| 7,422,782 B2 | 9/2008 | Haedt et al. | |
| 7,527,839 B2 | 5/2009 | Busche et al. | |
| 7,531,228 B2 | 5/2009 | Perre et al. | |
| 7,608,317 B2 | 10/2009 | Keckeisen et al. | |
| 7,686,513 B2 | 3/2010 | Knoerzer et al. | |
| 7,703,625 B2 | 4/2010 | Westphal | |
| 7,703,980 B2 | 4/2010 | Sampaio et al. | |
| 7,717,620 B2 | 5/2010 | Hebert et al. | |
| 7,862,869 B2 | 1/2011 | Papenfuss et al. | |
| 7,908,826 B2 | 3/2011 | Reaves et al. | |
| 7,931,142 B2 | 4/2011 | Kyritsis | |
| 7,967,510 B2 | 6/2011 | Martuch | |
| 8,079,475 B2 | 12/2011 | McArthur et al. | |
| 8,091,323 B2 | 1/2012 | Paterson | |
| 8,114,451 B2 | 2/2012 | Sierra-Gomez et al. | |
| 8,230,664 B2 | 7/2012 | Prizzi et al. | |
| 8,408,793 B2 | 4/2013 | Martuch | |
| 8,545,099 B2 * | 10/2013 | Davis | B29C 59/007 220/266 |
| 8,607,980 B2 * | 12/2013 | Aldridge | B65D 75/5833 206/460 |
| 8,616,374 B2 * | 12/2013 | Hemmerlin | B65D 75/5833 206/440 |
| 9,169,054 B2 * | 10/2015 | Willey | B32B 3/266 |
| 2003/0231811 A1 | 12/2003 | Hodson et al. | |
| 2005/0194282 A1 | 9/2005 | Kraimer et al. | |
| 2006/0171611 A1 | 8/2006 | Rapparini | |
| 2008/0260304 A1 | 10/2008 | Hodson | |
| 2009/0226117 A1 * | 9/2009 | Davis | B29C 59/007 383/5 |
| 2010/0111453 A1 | 5/2010 | Dierl | |
| 2010/0113241 A1 | 5/2010 | Hebert et al. | |
| 2010/0144507 A1 | 6/2010 | Yeager | |
| 2010/0147724 A1 * | 6/2010 | Mitra-Shah | B65D 75/5833 206/459.1 |
| 2010/0172604 A1 * | 7/2010 | Andersson | B65D 75/366 383/211 |
| 2010/0209551 A1 * | 8/2010 | Mitra-Shah | B65D 75/20 426/5 |
| 2010/0290723 A1 | 11/2010 | Shinozaki et al. | |
| 2011/0036741 A1 | 2/2011 | Moehlenbrock | |
| 2011/0038569 A1 | 2/2011 | Huffer et al. | |
| 2011/0038570 A1 | 2/2011 | Moehlenbrock et al. | |
| 2011/0038571 A1 | 2/2011 | Moehlenbrock | |
| 2011/0038573 A1 | 2/2011 | Moehlenbrock | |
| 2011/0139363 A1 | 6/2011 | Hebert et al. | |
| 2011/0180553 A1 * | 7/2011 | Surdziel | B65D 75/5833 220/660 |
| 2011/0204056 A1 | 8/2011 | Veternik et al. | |
| 2011/0253771 A1 | 10/2011 | Willey et al. | |
| 2011/0293207 A1 | 12/2011 | Edwards et al. | |
| 2011/0303574 A1 | 12/2011 | Aldridge et al. | |
| 2012/0000968 A1 | 1/2012 | Coyne et al. | |
| 2012/0061282 A1 | 3/2012 | McArthur et al. | |
| 2012/0128835 A1 | 5/2012 | Lyzenga et al. | |
| 2012/0170876 A1 | 7/2012 | Kuge et al. | |
| 2013/0008825 A1 | 1/2013 | McArthur et al. | |
| 2013/0114918 A1 | 5/2013 | Lyzenga et al. | |
| 2013/0121623 A1 | 5/2013 | Lyzenga et al. | |
| 2013/0121624 A1 | 5/2013 | Lyzenga et al. | |
| 2014/0185965 A1 * | 7/2014 | Lyzenga | B65B 61/02 383/99 |
| 2015/0016756 A1 * | 1/2015 | Down | B65D 75/5833 383/203 |
| 2015/0151872 A1 * | 6/2015 | Schofield | B65D 65/40 229/5.84 |
| 2015/0374033 A1 * | 12/2015 | Pilzecker | B65D 75/5833 206/264 |
| 2015/0375923 A1 * | 12/2015 | Pilzecker | B65D 85/1018 206/245 |
| 2016/0016714 A1 * | 1/2016 | Fenech, III | B65D 75/5833 206/459.1 |
| 2016/0229614 A1 * | 8/2016 | Huffer | B65D 75/5833 |

FOREIGN PATENT DOCUMENTS

| | | | |
|---|---|---|---|
| EP | 1382543 B1 | 1/2004 | |
| GB | 2084509 A | 4/1982 | |
| GB | 2390078 A * | 12/2003 | B65D 31/08 |
| WO | 2011019443 A1 | 2/2011 | |
| WO | 2011146616 A1 | 11/2011 | |
| WO | 2012036765 A1 | 3/2012 | |
| WO | 2012100996 A1 | 8/2012 | |
| WO | 2012154655 A1 | 11/2012 | |

\* cited by examiner

SCORED PACKAGE

BACKGROUND OF THE INVENTION

This present application relates to an easy-open package. Such package includes a first panel having a multilayer film having at least one score in each of two distinct layers.

Easy-open packages are known in the art. For example, some easy-open packages include a zipper. A zipper may be used to open and reclose the package. However, a package with a zipper creates inefficiencies due to additional material and additional manufacturing processes.

US Patent Application Publication Number US 2010/0111453 discloses a flexible package for use with vertical-form-fill se equipment. This package comprises a flexible film with offsetting, parallel cuts on each of the inner and outer layers. The cuts do not overlap or meet and do not completely perforate or completely cut the package through each layer along parallel planes of the films layers. The film layers comprise offsetting cuts at specific sides of the film and define a straight releasable opening along one side of the bag. However, such opening is not wide enough to create the desired accessibility to the package contents.

US Patent Application Publication Number US 2013/0121623 discloses a flexible film package having an elongated closure layer that extends over a score on a front panel and beyond the front panel to along the back panel. When such elongated closure layer is peeled away from the package to form an opening, the flap formed by the peeled away closure layer includes a PSA. As a result, crumbs and/or product contact the PSA if a consumer pours product out of the opening.

What is needed is an easy-open package that provides desired accessibility to the package contents via a wide opening and/or via a non-adhesive pour spout.

BRIEF SUMMARY OF THE INVENTION

This need is met by the scored package described in the present application. The scored package comprises a first panel, a second panel, a first edge connecting the first panel and the second panel, a second edge connecting the first panel and the second panel, a third edge connecting the first panel and the second panel and a fourth edge connecting the first panel and the second panel. The second panel is a flexible film. The first panel comprises a multilayer film comprising an exterior layer having a nonlinear first score line having a first end and a second end; each of the first end and the second end is positioned in the first panel. The multilayer film of the first panel also comprises an interior layer having a linear second score line having a first point spaced apart from a second point. The multilayer film, including the exterior layer and the interior layer, comprise various materials such that the exterior layer and the interior layer are adapted to be separated in a first region of the package. The first score line and the second score line define the area of the first region. The first score line and the second score line are also positioned non-parallel in a plane of the package such that the first score line intersects the second score line at each of the first point and the second point to form an opening in the package at the second score line when the exterior layer and the interior layer are separated. When the exterior layer and the interior layer are separated not only is the package opened but an adhesive-free pour spout is formed by the separated exterior layer. In one embodiment, this pout spout is non-folded.

In another embodiment, the first end and the second end of the first score line and the first end and the second end of the second score line may have various positions. For example, each may be positioned adjacent or non-adjacent to the first edge, the second edge, the third edge or the fourth edge of the scored package.

In another embodiment of the package, the first panel multilayer film may comprise additional layers. For example, the first panel multilayer film may further comprise an intermediate layer positioned between the exterior layer and the interior layer. This intermediate layer may comprise a release agent positioned between the exterior layer and the interior layer in the first region. The first panel multilayer film may further comprise a pattern connecting layer positioned between the release agent and the interior layer in the first region. The pattern connecting layer remains attached to the interior layer when the exterior layer and the interior layer are separated. Additionally, the exterior layer and the interior layer are adapted to be reattached in the first region. The first panel multilayer film may also comprise a flood ting layer positioned between the exterior layer and the interior layer.

The edges of the scored package may take various forms. For example, the third edge may comprise a fold between and connecting the first panel and the second panel, a gusset member formed or plowed in a fold between and connecting the first panel and the second panel or a gusset member inserted and sealed between and connecting the first panel and the second panel. If the third edge comprises a gusset member, the package is a stand-up pouch. As another example, the first edge, the second edge and the fourth edge may each comprise a heat seal.

The first score line may take various forms. For example, the first score line may have a shape that is arcuate, rectilinear, angled with lines of even length or lines of uneven length, inverted v-shaped, w-shaped or inverted w-shaped.

In another embodiment, the scored package comprises a first panel, a second panel, a first edge connecting the first panel and the second panel, a second edge connecting the first panel and the second panel, a third edge connecting the first panel and the second panel and a fourth edge connecting the first panel and the second panel. The second panel is a flexible film. The first panel comprises a multilayer film comprising an exterior layer having a nonlinear first score line having a first end and a second end; each of the first end and the second end is positioned in the first panel. The multilayer film of the first panel also comprises an interior layer having a linear second score line having a first point spaced apart from a second point, an intermediate layer comprising a release agent positioned between the exterior layer and the interior layer in a first region between the first score line and the second score line, a pattern connecting layer positioned between the intermediate layer and the interior layer in the first region and a flood connecting layer positioned between the pattern connecting layer and the interior layer in the first region. The various layers comprise various materials such that the exterior layer and the interior layer are adapted to be separated in the first region, as defined by the first score line and the second score line. The first score line and the second score line are positioned non-parallel in a plane of the package such that the first score line intersects the second score line at each of the first point and the second point to form an opening in the package at the second score line when the exterior layer and the interior layer are separated. When the exterior layer and the interior layer are separated not only is the packaged opened but an adhesive-free pour spout is formed by the separated exterior layer. In one embodiment, the pour spout is non-folded. When the exterior layer and the interior layer are separated, the pattern connecting layer remains attached to the interior layer. The exterior layer and the interior layer are adapted to be reattached in the first region so that the package may be reclosed.

Additional embodiments, features and advantages of the present application are described in and will be apparent from the detailed description and the drawings.

DETAILED DESCRIPTION OF THE INVENTION

Figure 1:
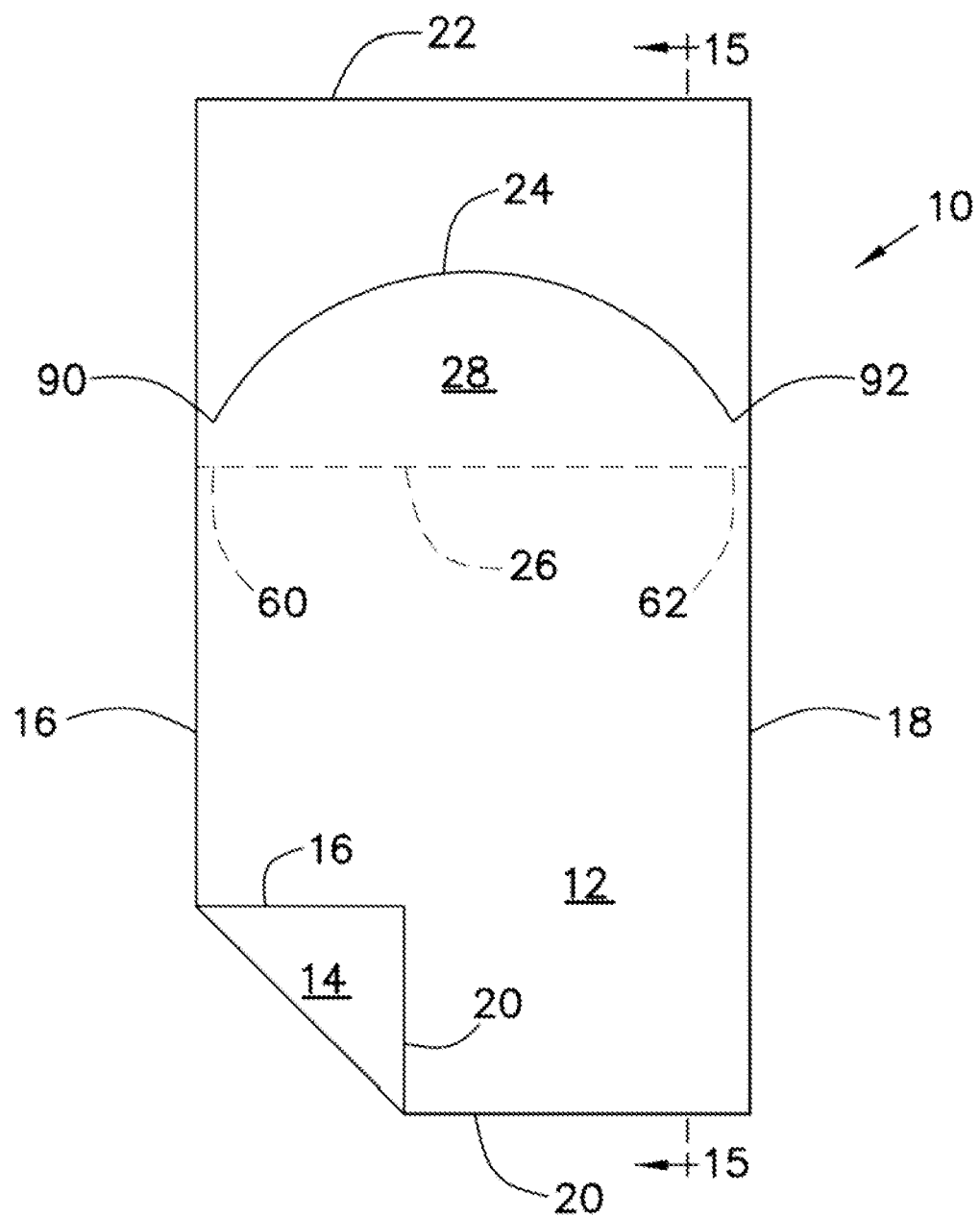
FIG. 1 is a plan view of a first embodiment of a package according to the present application.

As used throughout this application, the term "film" refers to a plastic web of any thickness and is not limited to a plastic web having a thickness of less than about 10 mil. The term "sheet" refers to a plastic web of any thickness and is not limited to a plastic web having a thickness of greater than about 10 mil. As used throughout this application, the term "web" refers to a continuous film or a continuous sheet.

As used throughout this application, the term "package" refers to any device used to wholly or partially surround an item. A package may take many, various forms, For example, the term "package" may include pouches that wholly surround an item (or items) to be packaged; the term "package" may also include films that partially surround an item (or items) to be packaged and, when used in conjunction with another material (such as a tray), wholly surround an item (or items).

As used throughout this application, the term "multilayer" refers to a plurality of layers in a single structure generally in the form of a film, sheet or web which may be made from a polymeric material or a non-polymeric material bonded together by any conventional means known in the art (i.e., coextrusion, lamination, coating or blends of such). The multilayer film described in the present application comprises a film including as many layers as desired but at least two layers.

As used throughout this application, the term "layer" refers to a discrete film or sheet component which may or may not be coextensive with the film or sheet but has substantially uniform composition. In referring to a monolayer film, "film," "sheet" and "layer" are synonymous.

As used throughout this application, the term "exterior layer" refers to a layer comprising the outermost surface of a film, sheet, web, package or other article. The term "interior layer" refers to a layer comprising the innermost surface of a film, sheet, web, package or other article. Additionally, the exterior layer and the interior layer each have an inner surface and an outer surface. The term "inner surface" refers to a surface touching another layer, and the term "outer surface" refers to a surface not touching another layer.

As used throughout this application, the term "intermediate layer" refers to a layer that is positioned between two other layers, An intermediate layer has two inner surfaces.

As used throughout this application, the term "score line" refers to a continuous or non-continuous series of holes, vents, slits, slots, perforations, notches, punctures, orifices, openings, inlets, channels, etc., in the surface of or through film layer. A score line may have varying depths. Its depth may extend from the first surface of a layer to the second surface of the layer (i.e., throughout the entire thickness of the layer). Alternatively, its depth may extend from about 50% to about 95% of the thickness of a layer. A score line may be formed by mechanical means (e.g., using a cutting blade), by chemical means (e.g., using solvents), by thermal means (e.g., by optical ablation) or by other means known in the art.

As used throughout this application, the term "optical ablation" refers to a method of localized vaporization or decomposition of polymeric material by means of a controlled laser beam which may be used to form an aperture in a thermoplastic material.

As used throughout this application, the term "nonlinear" refers to a shape or geometry that is not of, relating to, denoting or involving a straight line substantially throughout. A nonlinear shape or geometry has at least two dimensions or travels in at least two directions. As used throughout this application, the term "linear" refers to a shape or geometry that is of, relating to, denoting or involving a straight line substantially throughout. The term "straight line" refers to a line traced by a point traveling in a constant direction or a line having an equation that may be written in slope-intercept form y=mx+b, where "m" is the slope and "b" is the y-intercept.

As used throughout this application, the term "non-parallel" refers to at least two objects each having at least a portion that is non-parallel to the other in at least one plane. As such, other portions of the at least two objects may be parallel to each other in another plane.

As used throughout this application, the term "connecting layer" refers to a layer that is positioned between two other layers and may serve to temporarily or permanently join connect the two other layers. A connecting layer may include a flood connecting layer or a pattern connecting layer. As used throughout this application, each of a "flood connecting layer" and a "pattern connecting layer" is a connecting layer that may be applied to a portion or portions or the entire width between two other layers. In some but not all embodiments, a "flood connecting layer" is a connecting layer applied to the entire width between the two other layers. In some embodiment but not all embodiments, a "pattern connecting layer" is a connecting layer applied to a portion or portions of the width but not the entire width between the two other layers.

As used throughout this application, the term "outside" refers to a place or a region beyond a specified enclosure or boundary.

As used throughout this application, the term "separated" refers to two points, items or elements that are peeled apart, detached, parted or otherwise disconnected.

As used throughout this application, the term "spaced apart" refers to two points, items or elements that are at a distance from one another.

As used throughout this application, the term "intersects" refers to the reaching, meeting, crossing or corning together of two lines. The term "intersects" includes the physical meeting of two lines as well as the meeting of a plane of a first line and a plane of a second line without the physical meeting of the two lines themselves. For example, a first line and a second line may intersect by being close in proximity but not touching with a propagated tear bridging the remaining distance between the two lines.

As used throughout this application, the term "adjacent" refers to being near, close, contiguous, adjoining or neighboring in proximity. It includes but is not limited to being reasonably close to or in the vicinity of as well as touching, having a common boundary or having direct contact.

As used throughout this application, the term "non-adjacent" refers to being not adjacent. It includes but is not limited to being reasonably distant, far apart, detached or separated in proximity.

As used throughout this application, the term "arcuate" refers to a shape or geometry that is curved like a bow.

As used throughout this application, the term "angled" refers to a shape or geometry that is formed by two lines extending from the same point at an angle greater than 0 and less than 180. The lines may be of even or uneven length.

As used throughout this application, the term "rigid" refers to a characteristic as stiff, unyielding, not apt to substantially give way under pressure without breaking, unable to substantially bend without breaking or unable to substantially change shape without breaking.

As used throughout this application, the term "flexible" refers to a characteristic of easily yielding without breaking, apt to readily give way under pressure without breaking, able to readily change shape without breaking r able to readily bend without breaking.

As used throughout this application, the term "semi-rigid" refers to a characteristic of rigid to some degree or in some parts stiff and solid, but not inflexible. A semi-rigid material may be apt to give way under pressure without breaking, may be able to bend without breaking or may be able to change shape without breaking but not to the same degree as a flexible material.

As used throughout this application, the term "non-folded" refers to a characteristic of substantially straight and not bent down, bent over, rolled down, turned down, turned under, doubled over, etc.

As used throughout this application, the term "polymer" refers to a material which is the product of a polymerization or copolymerization reaction of natural, synthetic or combined natural and synthetic monomers and/or co-monomers and is inclusive of homopolymers, copolymers, terpolymers, etc. In general, the layers of the multilayer film described in the present application may comprise a single polymer, a mixture of a single polymer and non-polymeric material, a combination of two or more polymers blended together, or a mixture of a blend of two or more polymers and non-polymeric material. It will be noted that many polymers may be synthesized by the mutual reaction of complementary monomers. It will also be noted that some polymers are obtained by the chemical modification of other polymers such that the structure of the macromolecules that constitute the resulting polymer may be thought of as having been formed by the homopolymerization of a hypothetical monomer.

As used throughout this application, the term "thermoplastic" refers to a polymer or polymer mixture that softens when exposed to heat and then returns to its original condition when cooled to room temperature. In general, thermoplastic materials may include natural or synthetic polymers. Thermoplastic materials may further include any polymer that is cross-linked by either radiation or chemical reaction during manufacturing or post-manufacturing processes.

As used throughout this application, the term "barrier" refers to any material which controls a permeable element of the film, sheet, web, package, etc., against aggressive agents and includes but is not limited to air baffler, oxygen barrier, moisture water, humidity, etc.) barrier, chemical barrier, heat barrier, light barrier and/or odor barrier.

As used throughout this application, the term "barrier layer" refers to a layer of the film, sheet, web, package, etc., designed to control a permeable element.

As used throughout this application, the term "polyvinylidene chloride copolymer" or "PVdC" refers to a polymer derived from vinylidene chloride. PVdC may be formed from the polymerization of vinylide chloride with various monomers including but not limited to acrylic esters and unsaturated carboxyl groups.

As used throughout this application, the term "ethylene vinyl alcohol copolymer" or "EVOH" refers to copolymers comprised of repeating units of ethylene and vinyl alcohol. Ethylene vinyl alcohol copolymers can be represented by the general formula: $[(CH_2-C_2)_m-(CH_2-CH(OH))]_n$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. The degree of hydrolysis is preferably at least 50% and, more preferably, at least 85%. Preferably, ethylene vinyl alcohol copolymers comprise from about 28 mole percent to about 48 mole percent ethylene, more preferably, from about 32 mole percent to about 44 mole percent ethylene, and, even more preferably, from about 38 mole percent to about 44 mole percent ethylene. Specific non-limiting examples of EVOH include EVAL™ H171B available from EVAL Company of America (Houston, Tex.); Evasin® EV-3851 available from Chang Chun Petrochemical Co., Ltd. (Taipei, Taiwan); and Soarnol® ET3803 RB available from Soarus L.L.C. (Arlington Heights, Ill.).

As used throughout this application, the term "sealant layer" refers to a layer or layers of a film, sheet, web, package, etc., involved in the sealing of the film, sheet, web, package, etc., to itself, to another layer of the same or another film, web, sheet, package, etc., and/or to another article, such as a tray. In general, the sealant layer is an interior layer of any suitable thickness that provides for the sealing of the film, sheet, web, package, etc., to itself or to another layer or to another article. With respect to packages having only fin-type seals, as opposed to lap-type seals, the phrase "sealant layer" generally refers to the interior layer of a film, sheet, web, package, etc. The sealant layer may also serve as a food contact layer in the packaging of foods.

As used throughout this application, the term "sealant material" refers to any material suitable for a sealant layer. Sealant material includes but is not limited to heat sealable polymeric material such as a polyolefin (e.g., polyethylene or polypropylene) or blends of such. Such polyolefins include, for example, polyethylenes such as low density polyethylene (LDPE), high density polyethylene (HDPE), ethylene alpha-olefin copolymers (EAO) (also referred to as "copolymers of ethylene and at least one alpha-olefin") (including, for example, plastomers), very low density polyethylene (VLDPE), linear low density polyethylene (LLDPE), polypropylene homopolymers, polypropylene copolymers, polybutylene homopolymers, polybutylene copolymers or homogeneous polyolefin resins, such as those made with constrained geometry catalysts or metallocene single-site catalysts, including, for example, copolymers of ethylene or propylene with at least one $C_{4-8}$ or higher alpha-olefins (e.g., 1-butene, 1-hexene or 1-octene or blends of such) with a majority of polymeric units derived from ethylene or propylene. Ethylene vinyl acetate (EVA) copolymers, ethylene butyl acrylate copolymers (EBA), ethylene methyl acrylate copolymers (EMA), ethylene methacrylic acid copolymers (EMAA), ethylene ethyl acrylate copolymers (EEA), ethylene acrylic acid copolymers (EAA), polyesters and ionomers are also examples of sealant materials. Suitable sealant materials also include those disclosed in U.S. Pat. Nos. 6,964,816; 6,861,127; 6,815,023; 6,773,820; 6,682,825; 6,316,067; 5,759,648; and 5,663,002 and US Patent Application Publications 2005/0129969 and 2004/0166262, each of which is incorporated in its entirety in this application by this reference. Sealant materials may also comprise polyamides such as nylon, polyesters such as polyethylene terephthalate (PET), polystyrene, polycarbonates, cyclic olefin copolymers, polyacrylonitrile or polymers or blends of such. Specific examples of sealant materials include but are not limited to ethylene alpha-olefin copolymers commercially available from The Dow Chemical Company (Midland, Mich.) under trade names Affinity™, Attane™ or Elite™ (including 1-octene as an alpha-olefin) and from ExxonMobil Chemical Company (Houston, Tex.) under the trade name Exact™ (including 1-hexene, 1-butene and 1-octene as comonomers) and ionomers commercially available from E. I. du Pont de Nemours and Company (Wilmington, Del.) under the trade name Surlyn®.

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate or otherwise. The term "polyethylene" or "PE" will be used without regard to the presence or absence of substituent branch groups.

As used throughout this application, the term "high density polyethylene" or "HDPE" refers to both (a) homopolymers of ethylene which have densities from about 0.960 g/cm$^3$ to about 0.970 g/cm$^3$ and (b) copolymers of ethylene and an alpha-olefin (usually 1-butene or 1-hexene) which have densities from about 0.940 g/cm$^3$ to about 0.958 g/cm$^3$. HDPE includes polymers made with Ziegler or Phillips type catalysts and polymers made with single-site metallocene catalysts. HDPE also includes high molecular weight polyethylenes. In contrast to HDPE, whose polymer chain has some branching, are "ultra high molecular weight polyethylenes," which are essentially unbranched specialty polymers having a much higher molecular weight than the high molecular weight HDPE.

As used throughout this application, the term "low density polyethylene" or "LDPE" refers to branched homopolymers having densities between 0.915 g/cm$^3$ and 0.930 g/cm$^3$, as well as copolymers containing polar groups resulting from copolymerization (such as with vinyl acetate or ethyl acrylate). LDPE typically contains long branches off the main chain (often termed "backbone") with alkyl substituents of two to eight carbon atoms.

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application, the term "copolymer of ethylene and at least one alpha-olefin" (also referred to as "ethylene-alpha olefin copolymer") refers to a modified or unmodified copolymer produced by the co-polymerization of ethylene and any one or more alpha-olefins. Suitable alpha-olefins include, for example, to $C_3$ to $C_{20}$ alpha-olefins such as propene, 1-butene, 1-pentene, 1-hexene, 1-octene, 1-decene and blends of such. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed trialkyl aluminum. Heterogeneous catalyzed copolymers of ethylene and an alpha-olefin may include linear low density polyethylene (LLDPE), very low density polyethylene (VLDPE) and ultra low density polyethylene (ULDPE) (commercially available as, for example, Dowlex™ from The Dow Chemical Company (Midland, Mich.)). Additionally, the co-polymerization of ethylene and an alpha-olefin may also be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ and Attane™ from The Dow Chemical Company (Midland, Mich.)), linear copolymers (commercially available as, for example, Tafmer™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). In general, homogeneous catalyzed ethylene alpha-olefin copolymers may be characterized by one or more methods known in the art, including but not limited to molecular weight distribution ($M_w/M_n$), composition distribution breadth index (CDBI), narrow melting point range and single melting point behavior.

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

As used throughout this application, the term "polypropylene" or "PP" refers to a homopolymer or copolymer having at least one propylene monomer linkage within the repeating backbone of the polymer. The propylene linkage can be represented by the general formula: $[CH_2-CH(CH_3)]_n$.

As used throughout this application, the term "ionomer" refers to a partially neutralized acid copolymer, such as a metal salt neutralized copolymer of ethylene and acrylic or methacrylic acid.

As used throughout this application, the term "polyester" refers to a homopolymer or copolymer having an ester linkage between monomer units which may be formed, for example, by condensation polymerization reactions between a dicarboxylic acid and a diol. The ester linkage can be represented by the general formula: $[O-R-OC(O)-R'-C(O)]_n$ where R and R' are the same or different alkyl (or aryl) group and may be generally formed from the polymerization of dicarboxylic acid and diol monomers containing both carboxylic acid and hydroxyl moieties. The dicarboxylic acid (including the carboxylic acid moieties) may be linear or aliphatic (e.g., lactic acid, oxalic acid, maleic acid, succinic acid, glutaric acid, adipic acid, pimelic add, suberic acid, azelaic acid, sebacic acid, and the like) or may be aromatic or alkyl-substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol and the like. Polyesters may include a homopolymer or copolymer of alkyl-aromatic esters including but not limited to polyethylene terephthalate (PET), amorphous polyethylene terephthalate (APET), crystalline polyethylene terephthalate (CPET), glycol-modified polyethylene terephthalate (PETG) and polybutylene terephthalate; a copolymer of terephthalate and isophthalate including but not limited to polyethylene terephthalate/isophthalate copolymer; a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

As used throughout this application, the term "polystyrene" or "PS" refers to a homopolymer or copolymer having at least one styrene monomer linkage (such as benzene monomer (i.e., $C_6H_5$) with an ethylene substituent) within the repeating backbone of the polymer. The styrene linkage can be represented by the general formula: $[CH_2-CH_2(C_6H_5)]_n$. Polystyrene may be formed by any method known in the art.

As used throughout this application, the term "polyamicle" or "PA" or "nylon" refers to a homopolymer or copolymer having an amide linkage between monomer units which may be formed by any method known in the art. The amide linkage can be represented by the general formula: $[C(O)-R-C(O)-NH-R'-NH]_n$ where R and R' are the same or different alkyl (or aryl) group. Nylon polymers may be high-temperature, low-temperature or amorphous, as described in, for example, International Publication Number WO 2006/063283, which is incorporated in its entirety in this application by this reference. Examples of nylon polymers include but are not limited to nylon 6 (polycaprolactam), nylon 11 (polyundecanolactarn), nylon 12 (polyauryllactam), nylon 4,2 (polytetramethylene ethylenediamide), nylon 4,6 (polytetramethylene adipamidle), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), and nylon 12,12 (polydodecamethylene dodecanediamide). Examples of nylon copolymers include but are not limited to nylon 6,6/6 copolymer (polyhexamethylene adipamide/caprolactam copolymer), nylon 6,6/9 copolymer (polyhexamethylene adipamide/azelaiamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,9/6 copolymer (polyhexamethylene adipamide/hexamethylene azelaiamide/caprolactam copolymer). Examples of aromatic nylon polymers include but are not limited to nylon 4,l, nylon 6,l, nylon 6,6/6l copolymer, nylon 6,6/6T copolymer, nylon MXD6 (poly-m-xylylene adipamide), poly-p-xylylene adipamide, nylon 6l/6T copolymer, nylon 6T/6l copolymer, nylon MXDI, nylon 6/MXDT/I copolymer, nylon 6T (polyhexamethylene terephthalamide), nylon 12T (polyclo-clecarnethylene terephthalamide), nylon 66T, and nylon 6-3-T (poly(trimethyl hexamethylene terephthalamide).

As used throughout this application, the term "oriented" refers to a film, sheet, web, etc., which has been elongated in at least one of the machine direction or the transverse direction. Such elongation is accomplished by procedures known in the art. Non-limiting examples of such procedure include the single bubble blown film extrusion process and the slot case sheet extrusion process with subsequent stretching, for example, by tentering, to provide orientation. Another example of such procedure is the trapped bubble or double bubble process. (See, for example, U.S. Pat. Nos. 3,546,044 and 6,511,688, each of which is incorporated in its entirety in this application by this reference.) In the trapped bubble or double bubble process, an extruded primary tube leaving the tubular extrusion die is cooled, collapsed and then oriented by reheating, reinflating to form a secondary bubble and recooling. Transverse direction orientation may be accomplished by inflation, radially expanding the heated film tube. Machine direction orientation may be accomplished by the use of nip rolls rotating at different speeds, pulling or drawing the film tube in the machine direction. The combination of elongation at elevated temperature followed by cooling causes an alignment of the polymer chains to a more parallel configuration, thereby improving the mechanical properties of the film, sheet, web, package, etc. Upon subsequent heating of an unrestrained, unannealed, oriented article to its orientation temperature, heat-shrinkage (as measured in accordance with ASTM Test Method D2732, "Standard Test Method for Unrestrained Linear Thermal Shrinkage of Plastic Film and Sheeting," which is incorporated in its entirety in this application by this reference) may be produced. Heat-shrinkage may be reduced if the oriented article is first annealed or heat-set by heating to an elevated temperature, preferably to an elevated temperature which is above the glass transition temperature and below the crystalline melting point of the polymer comprising the article. This reheating/annealing heat-setting step also provides a polymeric web of uniform flat width. The polymeric web may be annealed (i.e., heated to an elevated temperature) either in-line with (and subsequent to) or off-line (and in another process) from the orientation process.

As used throughout this application, the term "tie material" refers to a polymeric material serving a primary purpose or function of adhering two surfaces to one another, presumably the planar surfaces of two film layers. For example, a tie material adheres one film layer surface to another film layer surface or one area of a film layer surface to another area of the same film layer surface. The tie material may comprise any polymer, copolymer or blend of polymers having a polar group or any other polymer, homopolymer, copolymer or blend of polymers, including modified and unmodified polymers (such as grafted copolymers) which provide sufficient interlayer adhesion to adjacent layers comprising otherwise nonadhering polymers.

As used throughout this application, the term "coextruded" refers to the process of extruding two or more polymer materials through a single die with two or more orifices arranged so that the extrudates merge and weld together into a laminar structure before chilling (i.e., quenching). Coextrusion methods known in the art include but are not limited to blown film coextrusion, slot cast coextrusion and extrusion coating. The flat die or slot cast process includes extruding polymer streams through a flat or slot die onto a chilled roll and subsequently winding the film onto a core to form a roll of film for further processing.

As used throughout this application, the term "blown film" refers to a film produced by the blown coextrusion process. In the blown coextrusion process, a s of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel and then rapidly cooled or quenched by any of various methods known in the art.

Referring now to the drawings, with some but not all embodiments shown, with elements depicted as illustrative and not necessarily to scale, and with the same (or similar) reference numbers denoting the same (or similar) features throughout the drawings, FIG. 1 is a plan view of a first embodiment of a package according to the present application. Package 10 depicted in FIG. 1 is a filled, unopened package with an up-turned corner. Package 10 has first panel 12 and second panel 14. First edge 16 connects first panel 12 and second panel 14. Second edge 18 connects first panel 12 and second panel 14. Third edge 20 connects first panel 12 and second panel 14. Fourth edge 22 connects first panel 12 and second panel 14.

The configuration for package 10 may be any one of a variety known in the art, the only limitation being that the second panel of any such package is a flexible film. As such, possible packaging configurations include but are not limited to a horizontal-form-fill-seal package, a vertical form-fill-seal package, a lap-seal package, a fin-seal package, a quad pack, a quad-seal package, a pouch, a stand-up pouch, a pillow pouch, a forming/non-forming package, a thermo-formed tray with lid or other packaging configurations known in the art. With the various packaging configurations, first edge 16, second edge 18, third edge 20 and fourth edge 22 may take various forms. Such forms include but are not limited to a seal (e.g., an ultrasonic seal, a heat seal, a pressure seal or other seal known in the art) connecting first panel 12 and second panel 14, a fold between and connecting first panel 12 and second panel 14, a gusset member formed or plowed in a fold between and connecting first panel 12 and second panel 14, a gusset member inserted and sealed between and connecting first panel 12 and second panel 14, other sealing or connecting forms or means known in the art, or combinations of the above.

Figure 2:
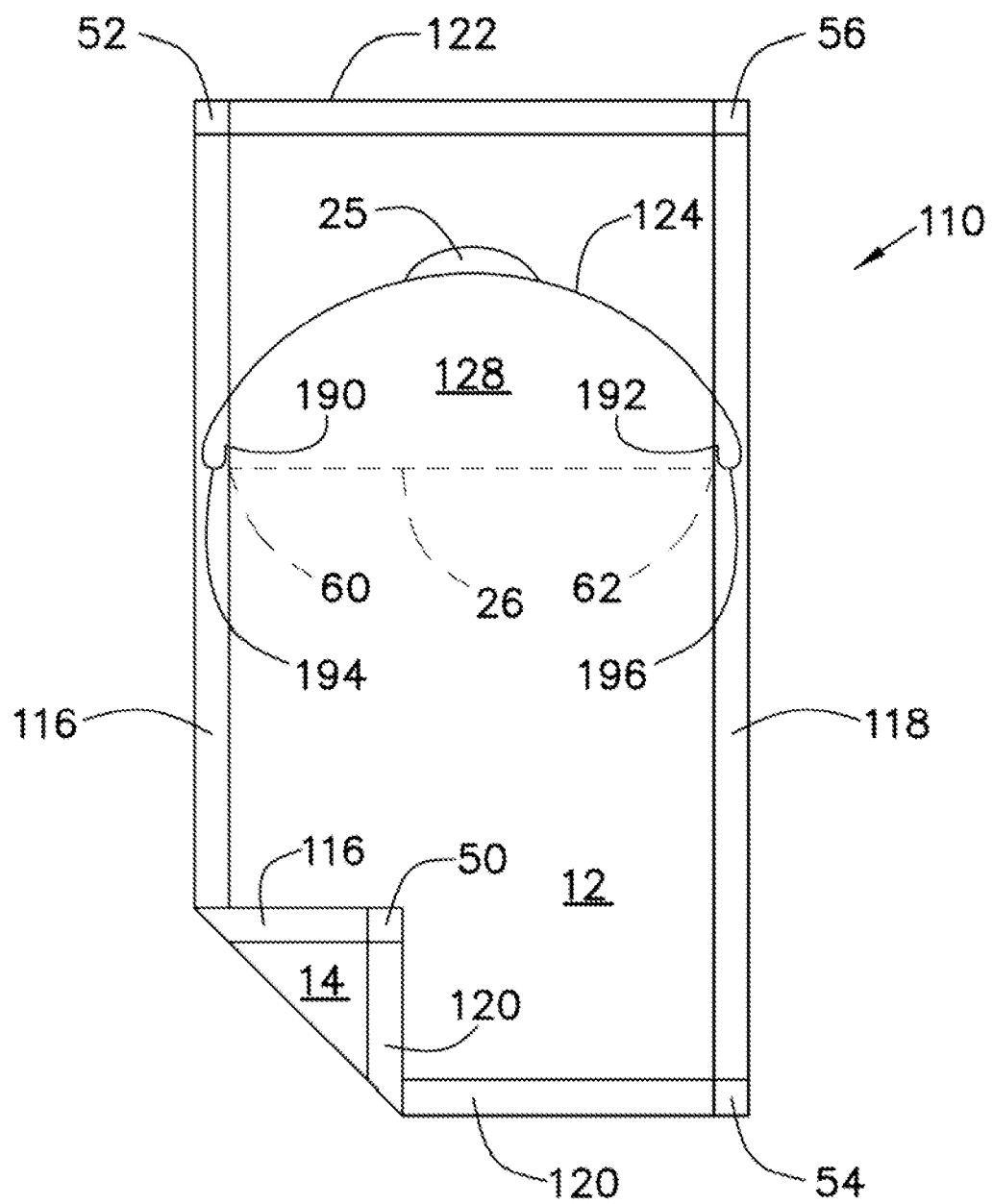
FIG. 2 is a plan view of a second embodiment of a package according to the present application.

For example, first edge 16, second edge 18, third edge 20 and fourth edge 22 may each comprise a seal (e.g., ultrasonic seal, heat seal, pressure seal or any other seal known in the art) connecting first panel 12 and second panel 14. FIG. 2 is a plan view of a second embodiment of a package according to the present application. Alternate package 110 depicted in FIG. 2 is a filled, unopened package with an up-turned corner. Alternate package 110 has first panel 12 and second panel 14. Alternate first seal 116 connects first panel 12 and second panel 14 and overlaps alternate third seal 120 at first corner 50 and alternate fourth seal 122 at second corner 52. Alternate second seal 118 connects first panel 12 and second panel 14 and overlaps alternate third seal 120 at third corner 54 and alternate fourth seal 122 at fourth corner 56. Alternate third seal 120 connects first panel 12 and second panel 14 and overlaps alternate first seal 116 at first corner 50 and alternate second seal 118 at third corner 54. Alternate fourth seal 122 connects first panel 12 and second panel 14 and overlaps alternate first seal 116 at second corner 52 and alternate second seal 118 at fourth corner 56. Alternate first seal 116, alternate second seal 118, alternate third seal 120 and alternate fourth seal 122 may be ultrasonic seals, heat seals, pressure seals or any other seals know the art.

Figure 3:
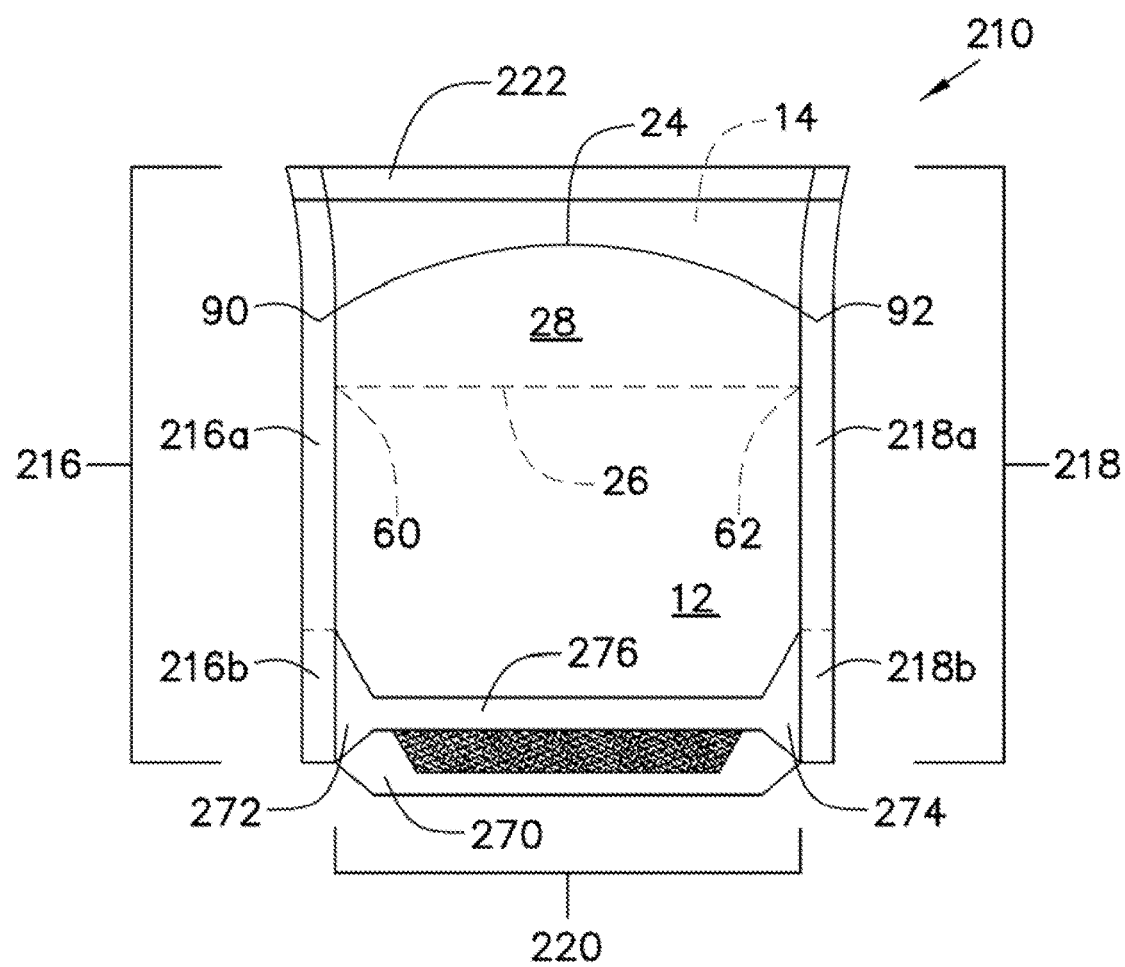
FIG. 3 is a bottom perspective view of a third embodiment of a package according to the present application.

As another example of a packaging configuration, first edge 16, second edge 18 and fourth edge 22 may each comprise a seal (e.g., ultrasonic seal, heat seal, pressure seal or any other seal known in the art) connecting first panel 12 and second panel 14; and third edge 20 may comprise a gusset member formed or plowed in a fold between and connecting first panel 12 and second panel 14. FIG. 3 is a bottom perspective view of a third embodiment of a package according to the present application. Second alternate package depicted 210 in FIG. 3 is a filled, unopened package. Second alternate package 210 has first panel 12, second panel 14 (behind and hidden by first panel 12 and therefore depicted with a thin broken line) and gusset member 220. Gusset member 220 includes gusset panel 270 (depicted with shadowing to show perspective), gusset first seal 272, gusset second seal 274 and gusset third seal 276. Gusset first seal 272, gusset second seal 274 and gusset third seal 276 may be ultrasonic seals, heat seals, pressure seals or any other seals known in the art and are formed when gusset member 220 is formed in the fold between and connecting first panel 12 and second panel 14. When second alternate package 210 is unfilled, gusset panel 270 may fold and be positioned between first panel 12 and second panel 14 so that second alternate package 210 lies substantially flat. Alternatively, gusset panel 270 may project outwardly from first panel 12 and second panel 14 so that second alternative package 210 may expand d have a rounded, oval or otherwise-shaped end. In general, for second alternate package 210, second alternate first seal 216 connects first panel 12 and second panel 14 via second alternate first seal first portion 216a; second alternate first seal 216 connects first panel 12, second panel 14 and gusset member 220 at second alternate first seal second portion 216b. Second alternate second seal 218 connects first panel 12 and second panel 14 via second alternate second seal first portion 218a; second alternate second seal 218 connects first panel 12, second panel 14 and gusset member 220 at second alternate second seal second portion 218b. Second alternate fourth seal 222 connects first panel 12 and second panel 14. Second alternate first seal 216, second alternate second seal 218 and second alternate fourth seal 222 may be ultrasonic seals, heat seals, pressure seals or any other seals known in the art.

Figure 4:
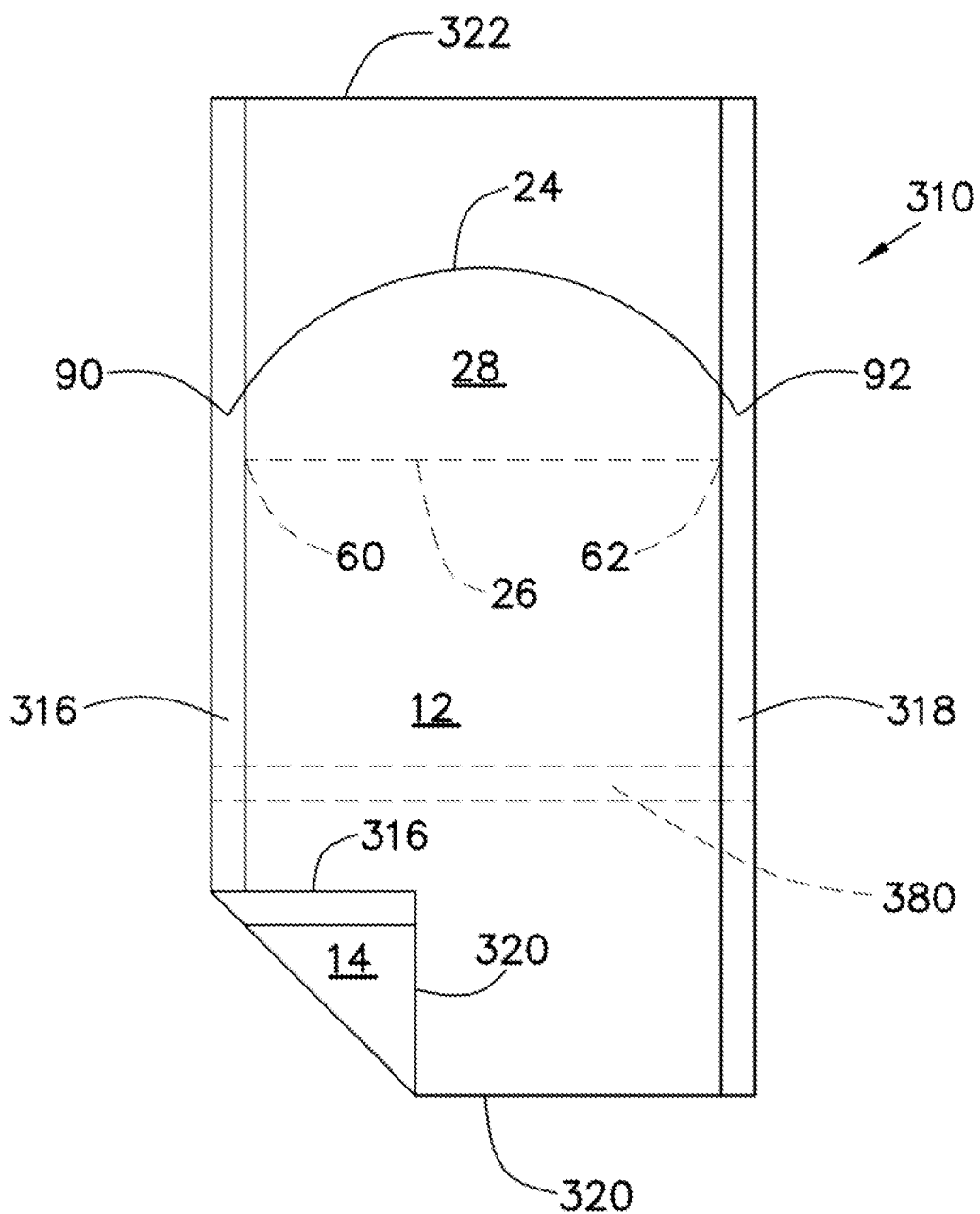
FIG. 4 is a plan view of a fourth embodiment of a package according to the present application.

As another example of a packaging configuration, first edge 16 and second edge 18 may each comprise a seal (e.g., ultrasonic seal, heat seal, pressure seal or any other seal known in the art) connecting first panel 12 and second panel 14; and third edge 20 and fourth edge 22 may each comprise a fold between and connecting first panel 12 and second panel 14. FIG. 4 is a plan view of a fourth embodiment of a package according to the present application. Third alternate package 310 depicted in FIG. 4. Is a filled, unopened package with an up-turned corner. Third alternate package 310 has first panel 12, second panel 14 and longitudinal seal 380 (in second panel 14 behind and hidden by first panel 12 and therefore depicted with a thin broken line). Longitudinal seal 380 may be a lap seal, a fin seal, a butt-seal tape, a seal-strip, etc., as known in the art. Third alternate first seal 316 is a seal (e.g., ultrasonic seal, heat seal, pressure seal or any other seal known in the art) connecting first panel 12 and second panel 14. Third alternate second seal 318 is a seal (e.g., ultrasonic seal, heat seal, pressure seal or any other seal known in the art) connecting first panel 12 and second panel 14. Third alternate third edge 320 is a fold between and connecting first panel 12 and second panel 14. Third alternate fourth edge is a fold between and connecting first panel 12 and second panel 14.

Figure 5:
FIGS. 5-10 are exemplary configurations for a first score line of a package according to the present application.
Figure 6:
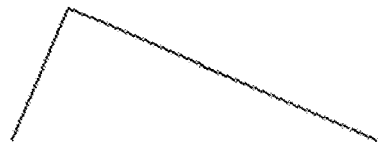
Figure 7:
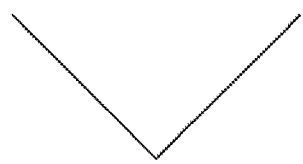
Figure 8:
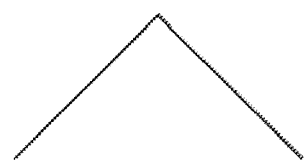
Figure 9:
Figure 10:

In each of the embodiments of FIGS. 1-4, first panel 12 comprises a multilayer film. The multilayer film comprises exterior layer 40 (see, e.g., FIG. 15) with nonlinear first score line 24 (in FIGS. 1, 3 and 4) or nonlinear alternate first score line 124 (in FIG. 2) and interior layer 36 (see, e.g., FIG. 15) with linear second score line 26. As second score line 26 is in interior layer 36, it is hidden in the views of package 10, package 110, package 210 and package 310 and is, therefore, depicted with a thin broken line. The area between first score line 24 and second score line 26 in FIGS. 1, 3 and 4 is first region 28. The area between alternate first score line 124 and second score 26 in FIG. 2 is alternate first region 128. Generally, the first score line in its various embodiments (e.g., first score line 24, alternate first score line 124) may take various shapes, geometries or configurations to suit desired packaging and product specifications. As non-limiting examples, first score line 24, 124 may be curved or arcuate (as in, for example, FIGS. 1-4), rectilinear (as in, for example, FIG. 5), angled with lines of even length (as in, for example, FIGS. 7 and 8) or lines of uneven length (as in, for example, FIG. 6), v-shaped (as in, for example, FIG. 7), inverted v-shaped (as in, for example, FIG. 8), vv-shaped (as in, for example, FIG. 9) or inverted w-shaped (as in, for example, FIG. 10). The only limitation for the shape, geometry or configuration of first score line 24, 124 is that first score line is nonlinear. Second score line 26 is linear and has first point 60 spaced apart from second point 62.

First score line 24 has an appreciable starting point as first end 90 and an appreciable ending point as second end 92. Alternate first score line 124 has an appreciable starting point as alternate first end 190 and an appreciable ending point as alternate second end 192. Each of first end 90, second end 92, alternate first end 190 and alternate second end 192 is positioned in first panel 12. In various embodiments of the package described in this application, the entirety of first score line 24 or alternate first score line 124 is also positioned in first panel 12. Also, in various embodiments of the package described in this application, the first end its various embodiments (e.g., first end 90, alternate first end 190) may be positioned adjacent or non-adjacent to first edge 16, second edge 18, third edge 20 or fourth edge 22; and the second end in its various embodiments (e.g., second end 92, alternate second end 192) may be positioned adjacent or non-adjacent to first edge 16, second edge 18, third edge 20 or fourth edge 22. Both the first end (e.g., first end 90, alternate first end 190) and the second end (e.g., second end 92, alternate send end 192) may be positioned the same (i.e., both adjacent or both non-adjacent) or different (e.g., one adjacent and one non-adjacent) from one another.

As non-limiting examples, in package 10 of FIG. 1, first end 90 is positioned adjacent to (in the vicinity of but not touching) first edge 16 and second end 92 is positioned adjacent to (in the vicinity of but not touching) second edge 18. In package 110 of FIG. 2, alternate first end 190 is positioned adjacent to (touching) alternate first seal 116 and alternate second end 192 is positioned adjacent to (touching) alternate second seal 118. In package 210 of FIG. 3, first end 90 is positioned adjacent to (touching) second alternate first seal 216 and second end 92 is positioned adjacent to (touching) second alternate second seal 218. In package 310 of FIG. 4, first end 90 is positioned adjacent to (touching) third alternate first seal 316 and second end 92 is positioned adjacent to (touching) third alternate second seal 318.

Figure 11:
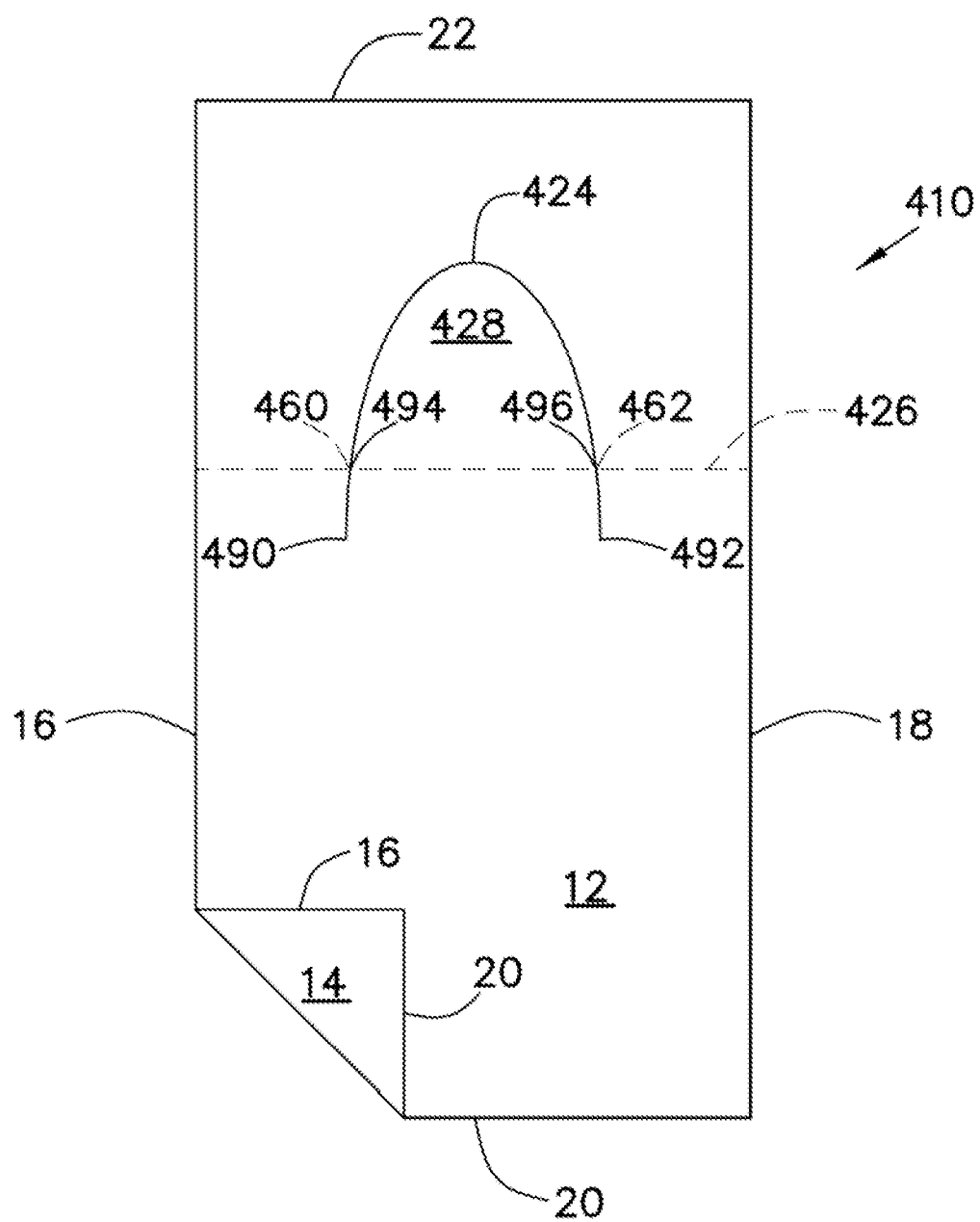
FIG. 11 is a plan view of a fifth embodiment of a package according to the present application.

As an alternate embodiment and additional non-limiting example, the first end of the first score line may be positioned non-adjacent to first edge 16 and the second end of the first score line may be positioned non-adjacent to second edge 18. FIG. 11 is a plan view of a fifth embodiment of a package according to the present application. Fourth alternate package 410 depicted in FIG. 11 is a filled, unopened package with an up-turned corner and is similar to package 10 depicted in FIG. 1 but with an alternate embodiment for the score lines. in FIG. 11, fourth alternate package 410 has first panel 12 and second panel 14. First edge 16 connects first panel 12 and second panel 14. Second edge 18 connects first panel 12 and second panel 14. Third edge 20 connects first panel 12 and second panel 14, Fourth edge 22 connects first panel 12 and second panel 14. First edge 16, second edge 18, third edge 20 and fourth edge 22 are as described above and may take the various forms as described above.

First panel 12 of package 410 comprises a multilayer film. The multilayer film comprises exterior layer 40 (see, e.g., FIG. 15) with nonlinear second alternate first score line 424 and interior layer 36 (see, e.g., FIG. 15) with linear alternate second score line 426. As alternate second score line 426 is in interior layer 36, it is hidden in the plan view of package 410 and is, therefore, depicted with a thin broken line. The area between second alternate first score line 424 and alternate second score line 426 is second alternate first region 428. As above, generally, second alternate first score line 424 may take various shapes, or configurations, with the only limitation being that second alternate first score line 424 is nonlinear. Alternate second score line 426 is linear and has alternate first point 460 spaced apart from alternate second point 462.

Second alternate first score line 424 has an appreciable starting point as second alternate first end 490 and an appreciable ending point s second alternate second end 492. Each of second alternate first end 490 and second alternate second end 492 is positioned in first panel 12. In various embodiments of the package described in this application, the entirety of second alternate first score line 424 is also positioned in first panel 12. In fourth alternate package 410 of FIG. 11, second alternate first end 490 is positioned non-adjacent to (reasonably distant from) first edge 16 and second alternate second end 490 is positioned non-adjacent to (reasonably distant from) second edge 18.

Within first panel 12, the first score line in its various embodiments (e.g., first score line 24, alternate first score line 124, second alternate score line 424) and the second score line in its various embodiments (e.g., second score line 26, alternate second score line 426) may each be positioned in various locations on first panel 12. For example, the first score line may be positioned such that the apex of the first score line is positioned about 0.5 inch from fourth edge 22 and the second score line may be spaced apart about 2 inches from the apex of the first score line. (As used throughout this application the "apex" of the first score line refers to the highest point of the nonlinear first score line relative to the linear second score line.) As another example, the first score line may be positioned such that the apex of the first score line is included in fourth edge 22 (with fourth edge 22 comprising a seal, e.g., alternate fourth seal 122 of FIG. 2) and the second score line may be spaced apart about 1 inch from the apex of the first score line.

Figure 12:
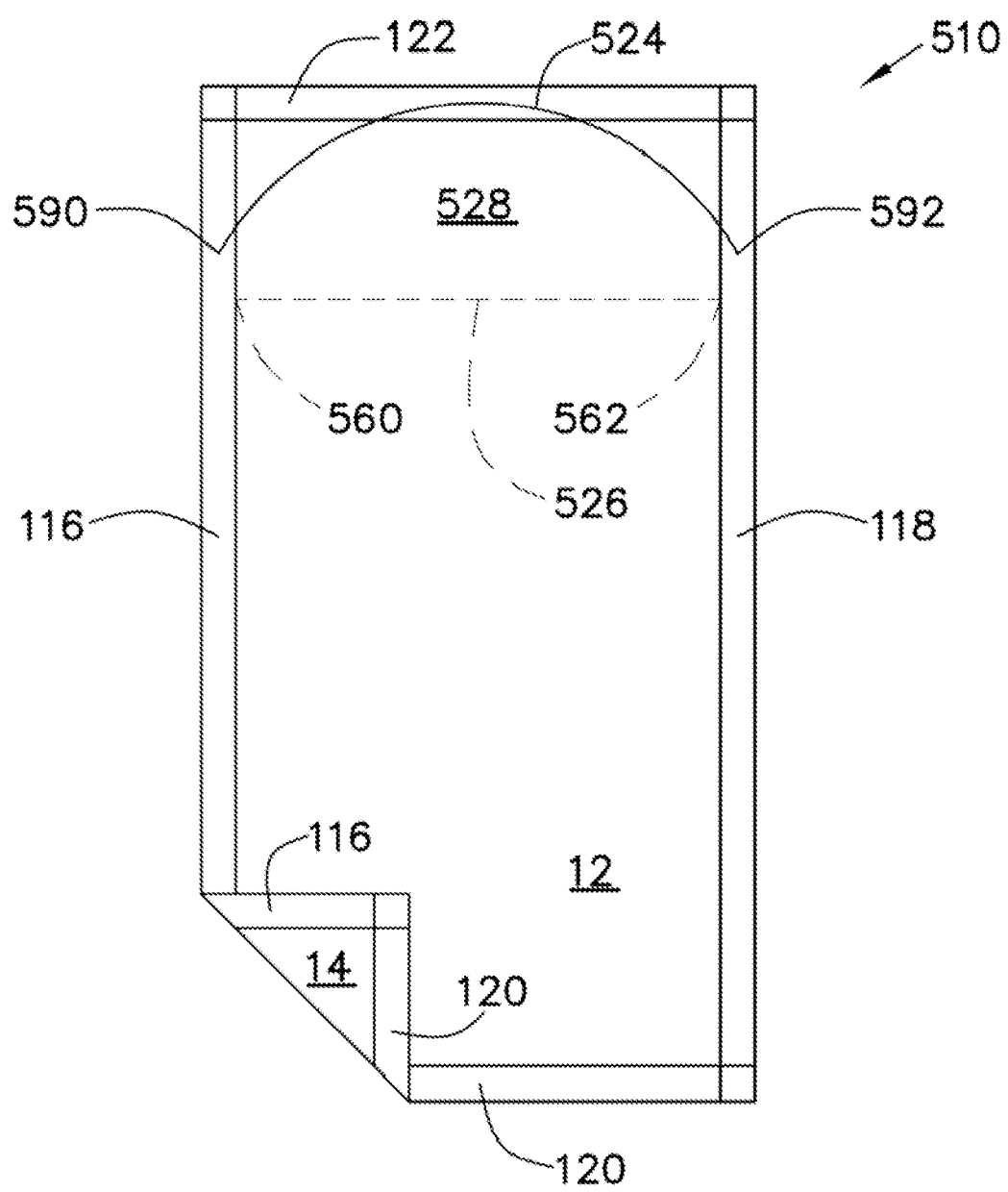
FIG. 12 is a plan view of a sixth embodiment of a package according to the present application.

FIG. 12 is a plan view of a sixth embodiment of a package according to the present application. Fifth alternate package 510 depicted in FIG. 12 is a filled, unopened package with an up-turned corner and is similar to alternate package 110 depicted in FIG. 2 but with alternate embodiments for the score lines.

In FIG. 12, fifth alternate package 510 has first panel 12 and second panel 14. Alternate first seal 116 connects first panel 12 and second panel 14. Alternate second seal 118 connects first panel 12 and second panel 14. Alternate third seal 120 (which in an alternate embodiment may be a gusset member, such as gusset member 220 described in FIG. 3) connects first panel 12 and second panel 14. Alternate fourth seal 122 connects first panel 12 and second panel 14. Alternate first seal 116, alternate second seal 118, alternate third seal 120 and alternate fourth seal 122 may be as described above First panel 12 of fifth alternate package 510 comprises a multilayer film. The multilayer film comprises exterior layer 40 (see, e.g., FIG. 15) with nonlinear third alternate first score line 524 and interior layer 36 (see, e.g., FIG. 15) with linear second alternate score line 526. As second alternate second score line 526 is in interior layer 36, it is hidden in the plan view of package 510 and is, therefore, depicted with a thin broken line. The area between third alternate first score line 524 and second alternate second score line 526 is third alternate first region 528. As above, generally, third alternate first score line 524 may take various shapes, geometries, or configurations, with the only limitation being that third alternate first score line 524 is nonlinear. Second alternate second score line 526 is linear and has second alternate first point 560 and second alternate second point 562. In fifth alternate package 510 the apex of third alternate first score line 524 is included in alternate fourth seal 122. Third alternate first score line 524 has an appreciable starting point as third alternate first end 590 and an appreciable ending point as third alternate second end 592. Each of third alternate first end 590 and third alternate second end 592 is positioned in first panel 12.

As a further example of positioning of score lines in first panel 12, the first score line may be positioned such that the apex of the first score line is adjacent a corner and the second score line may be spaced apart a distance (e.g., 0.25 inches, 0.50 inches, 0.75 inches, 1.0 inches, 1.25 inches, 1.5 inches, 1.75 inches, 2.0 inches, 2.25 inches, 2.5 inches, 2.75 inches, 3.0 inches, etc.) from the apex of the first score line. In this embodiment, the second score line is neither parallel to third edge 20 and fourth edge 22 nor perpendicular to first edge 16 and second edge 18.

Figure 13:
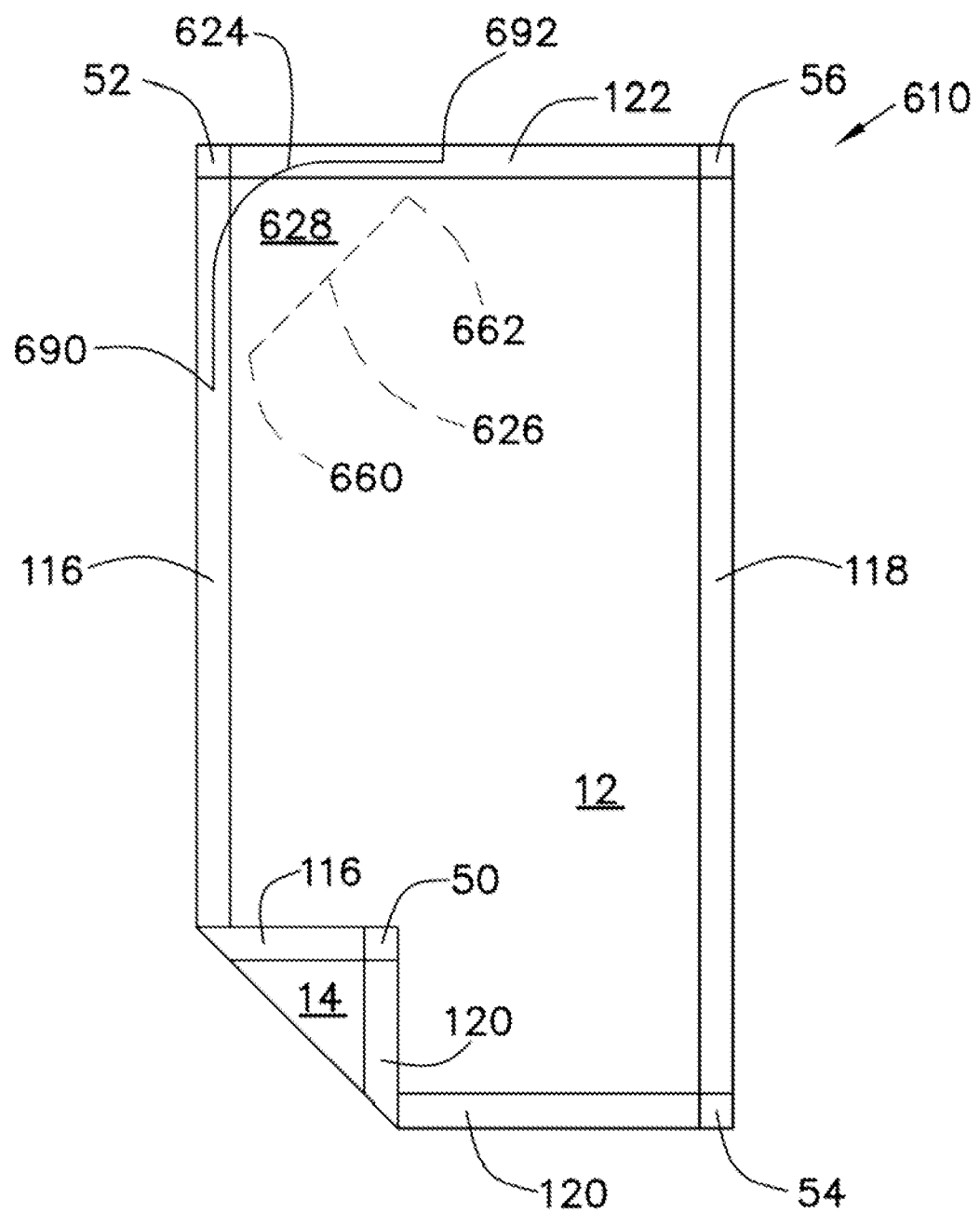
FIG. 13 is a plan view of a seventh embodiment of a package according to the present application.

FIG. 13 is a plan view of a seventh embodiment of a package according to the present application. Sixth alternate package 610 depicted in FIG. 13 is a filled, unopened package with an up-turned corner and is similar to alternate package 110 depicted in FIG. 2 but with alternate embodiments for the score lines.

In FIG. 13, sixth alternate package 610 has first panel 12 and second panel 14. Alternate first seal 116 connects first panel 12 and second panel 14 and overlaps alternate third seal 120 at first corner 50 and alternate fourth seal 122 at second corner 52. Alternate second seal 118 connects first panel 12 and second panel 14 and overlaps alternate third seal 120 at third corner 54 and alternate fourth seal 122 at fourth corner 56. Alternate third seal 120 (which in an alternate embodiment may be a gusset member, such as gusset member 220 described in FIG. 3) connects first panel 12 and second panel 14 and overlaps alternate first seal 116 at first corner 50 and alternate second seal 118 at third corner 54. Alternate fourth seal 122 connects first panel 12 and second panel 14 and overlaps alternate first seal 116 at second corner 52 and alternate second seal 118 at fourth corner 56. Alternate first seal 116, alternate second seal 118, alternate third seal 120 and alternate fourth seal 122 may be as described above.

First panel 12 of sixth alternate package 610 comprises a multilayer film. The multilayer film comprises exterior layer 40 (see, e.g., FIG. 15) with nonlinear fourth alternate first score line 624 and interior layer 36 (see, e.g., FIG. 15) with linear third alternate second score line 626. As third alternate second score line 626 is in interior layer 36, it is hidden in the plan view of package 610 and is, therefore, depicted with a thin broken line. The area between fourth alternate first score line 524 and third alternate second score line 626 is fourth alternate first region 628. As above, generally, fourth alternate first score line 624 may take various shapes, geometries or configurations, with the only limitation being that fourth alternate first score line 624 is nonlinear. Third alternate second score line 626 is linear and has third alternate first point 660 and third alternate second point 662. In sixth alternate package 610 the apex of fourth alternate first score line 624 is adjacent to (in the vicinity of but not touching) second corner 52, Fourth alternate first score line 624 has an appreciable starting point as fourth alternate first end 690 and an appreciable ending point s fourth alternate second end 692. Each of fourth alternate first end 690 and fourth alter ate second e Id 692 is positioned (first panel 12. Fourth alternate first end 690 is positioned adjacent (touching) alternate first seal 116, and fourth alternate second end 692 is positioned adjacent (touching) alternate fourth seal 122.

In FIG. 13, alternate second score line 626 is neither perpendicular to alternate first seal 116 and alternate second seal 118 nor parallel to alternate third seal 120 and alternate fourth seal 120.

In general the second sc e line in its various embodiments (e.g., second score line 26, alternate second sc e line 426, second alternate second score line 526, third alternate second score line 626) may be positioned such that the opening of the package (as described below) at the second score line does not interfere with the package contents. in other words, the second score line may be positioned above the fill-line for he package. The distance or space between the apex of the first score line in its various embodiments (e.g., first score line 24, alternate first score line 124, second alternate first score line 424, third alternate first score line 524, fourth alternate first score line 624) and the second score line may be determined by packaging configuration, package contents, package fill-level, package materials (as described below), pour spout (as described below) configuration desired and other factors as recognized by a person of ordinary skill in the art. Such distance may be 0.25 inches, 0.50 inches, 0.75 inches, 1.0 inches, 1.25 inches, 1.5 inches, 1.75 inches, 2.0 inches, 2.25 inches, 2.5 inches, 2.75 inches, 3.0 inches, etc.

In the various embodiments of the package described in the present application, the first score line in its various embodiments (e.g., first score line 24, alternate first score line 124, second alternate first score line 424, third alternate first score line 524, fourth alternate first score line 624) and the second score line in its various embodiments (e.g., second score line 26, alternate second score line 426, second alternate second score line 526, third alternate second score line 626) are positioned non-parallel in the plane of the package. For example, in the plane of package 10 shown in the plan view of FIG. 1, nonlinear first score line 24 (having an arcuate shape) and linear second score line 26 (having a straight shape) are non-parallel. As such, first score line 24 and second score line 26 intersect in the plane of first panel 12 to open the package. The intersection of the first score line (in its various embodiments) and the second score line (in its various embodiments) includes the physical meeting of the first score line and the second score line as well as the meeting of a plane of the first score line and a plane of the second score line without the physical meeting of the first score line and the second score line. In the latter instance, a propagated tear may bridge the distance between the first score line and the second score line.

As a non-limiting example, to open package 10 of FIG. 1, first region 28 of first panel 12 is grasped near first score line 24, separated and moved towards second score line 26. As further described below, the structure of the multilayer film of first panel 12 facilitates the separation of exterior layer 40 (see, e.g., FIG. 15) from interior layer 36 (see e.g., FIG. 15) in first region 28. First region 28 may include a pull tab (not shown in FIG. 1) or other means known in the art to facilitate grasping and moving of first region 28. When first region 28 is moved towards second score line 26, first end 90 of first score line 24 intersects first point 60 of second score line 26 and second end 92 of first score line 24 intersects second point 62 of second score line 26. This exposes, rupture or severs second score line 26 and form n opening in package 10 (see, e.g., opening 30 in FIG. 14.) In package 10, a plane of first score line 24 and a plane of second score line 26 intersect, as a propagated tear bridges the distance between first end 90 and first point 60 and another propagated tear bridges the distance between second end 92 and second point 62.

As another non-limiting example of the opening of the package described in the present application, to open package 110 of FIG. 2, alternate first region 128 of first panel 12 is grasped via pull tab 25, separated and moved towards second score line 26. Again, as further described below, the structure of the multilayer film of first panel 12 facilitates the separation of exterior layer 40 (see e.g., FIG. 15) from interior layer 36 (see e.g., FIG. 15) in alternate first region 128. When alternate first region 128 is moved towards second score line 26, alternate first score line 124 intersects second score line 26 to expose, rupture or sever second score line and form an opening in package 110. Alternate first score 124 of package 110 includes alternate first end 190, alternate second end 192, first tear point 194 and second tear point 196. First tear point 194 and second tear point 196 are tangent to a hypothetical or theoretical extension of second score line 26 (such extension not shown in FIG. 2). (In practice, alternate first seal 116 and alternate second seal 118, for example, fuse any portions of second score line 26 positioned in the areas of, for example, alternate first seal 116 and alternate second seal 118 prior to sealing. Such fusion occurs as a result of the materials present in interior layer 36. Accordingly, second score line 26 is not physically present in alternate first seal 116 or alternate second seal 118 in package 110. First score line in its various embodiments is not fused in alternate first seal 116 or alternate second seal 118, for example, due to the materials present in exterior layer 40.) First tear point 194 intersects first point 60 and second tear point 196 intersects second point 62 to expose second score line 26 and form an opening in package 110. As above, a plane of alternate first score line 124 and a plane of second score line 26 intersect, as a propagated tear bridges the distance between first tear point 194 and first point 60 and another propagated tear bridges the distance between second tear point 196 and second point 62. Alternate first score line 124 includes two "J-hooks": (1) the score line portion between first tear point 194 and alternate first end 190 and (2) the score line portion between second tear point 196 and alternate second end 192. The J-hooks are examples of tear stops. Other means to reduce tear propagation, including but not limited to "smile" terminates and reverse "J-hook" terminates, are known in the art.

As a further non-limiting example of package opening, to open package 410 of FIG. 11, second alternate region 428 of first panel 12 is grasped near second alternate first score line 424, separated and moved towards alternate second score line 426. Again, as further described below, the structure of the multilayer film of first panel 12 facilitates the separation of exterior layer 40 (see, e.g., FIG. 15) from interior layer 36 (see e.g., FIG. 15) in second alternate first region 428. As above, second alternate first region 428 n ay include a pull tab (not shown in FIG. 11) or other means known in the art to facilitate grasping and moving of second alternate first region 428. When second alternate first region 428 is moved towards alternate second score line 426, alternate first tear point 494 of second alternate first score line 424 intersects alternate first point 460 of alternate second score line 426 and alternate second tear point 496 of second alternate first score line 424 intersects alternate second point 462 of alternate second score line 426. This exposes, ruptures or severs alternate second score line 426 and forms an opening in package 410. In package 410, second alternate first score line 424 and alternate second score line 426 intersect by physically meeting; propagated tears are not used to bridge any distance between second alternate first score line 424 and alternate second score line 426.

Figure 14:
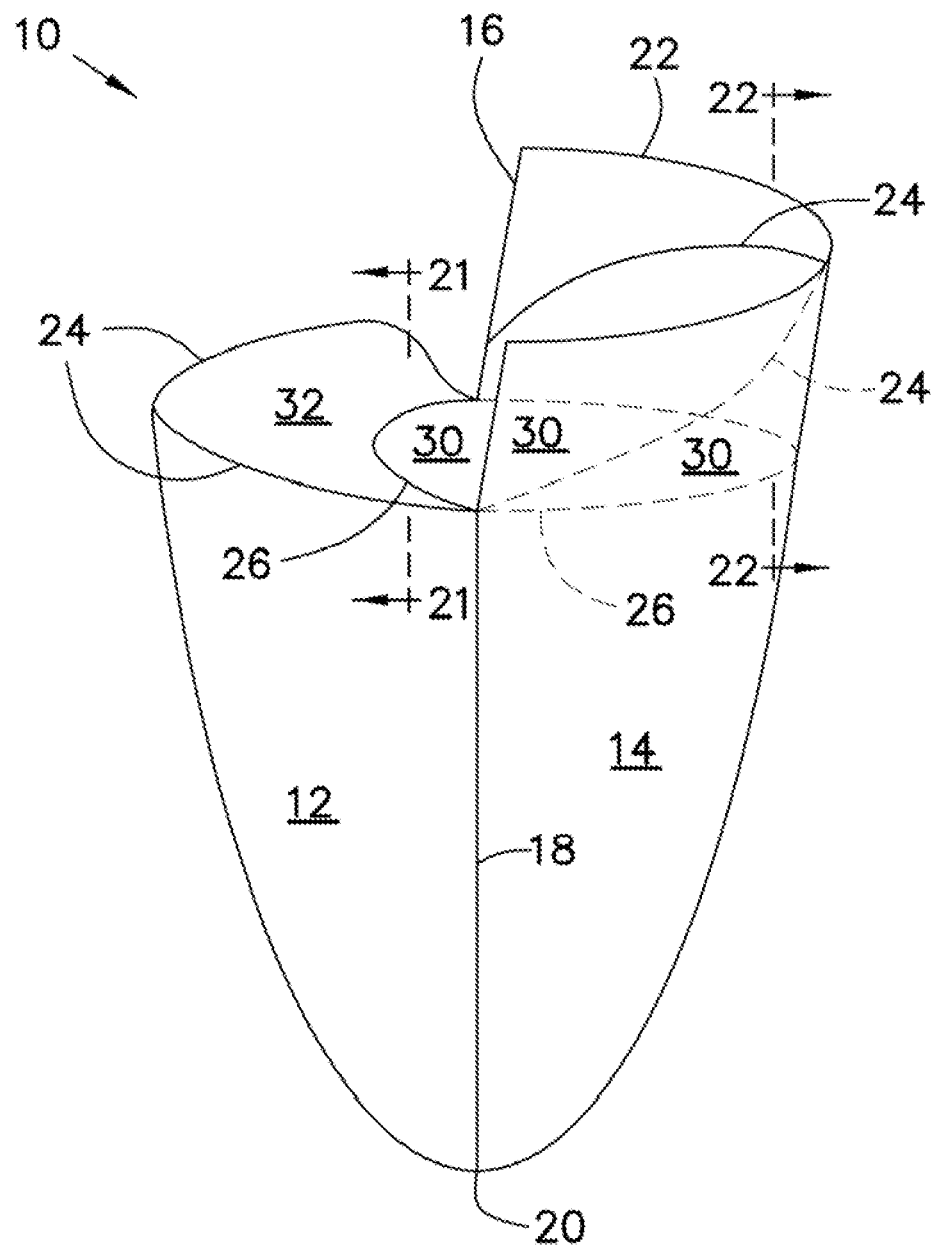
FIG. 14 is a perspective side view of the package of FIG. 1, with the package in an open state.

FIG. 14 is a perspective side view of the package of FIG. 1, with the package in an open state. As described above, when the first region in its various embodiments (e.g., first region 28, alternate first region 128, second alternate first region 428, third alternate first region 528, fourth alternate first region 628) is separated, opening 30 is formed. Opening 30 provides access to the contents of the package. The arrangement of the first score line and the second score line determines the extent of such access. For example, in package 10 depicted in FIG. 1 and FIG. 14, opening 30 (as wide opening) may provide hand access to substantially all of the articles or other items contained within package 10. Alternatively, in package 410 depicted in FIG. 11, the opening (not depicted in HG. 11) is not as wide and may provide hand access to less than all of the articles or other items contained within package 410.

The separation of the first region in its various embodiments also forms adhesive-free pour spout 32. Pour spout 32 may be used to dispense or pour the contents of the package described in the present application. Pour spout 32 includes the portion of exterior layer 40 (see e.g., FIG. 15) present in the first region. In an embodiment of the present application, pour spout 32 remains substantially straight and non-folded, as it is not bent down, bent over, rolled down, turned down, turned under, doubled over, etc.

Figure 15:
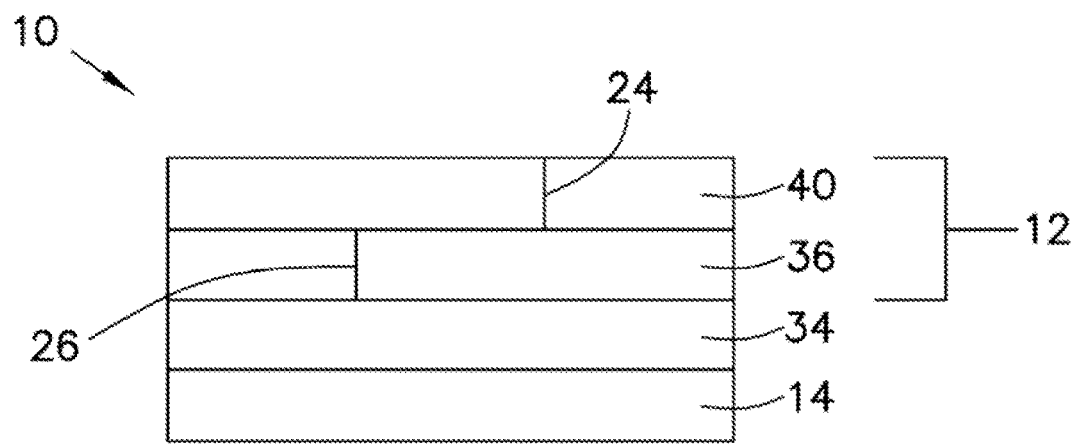
FIG. 15 is a first cross-sectional embodiment of the package of FIG. 1, taken along the lines 15-15 of FIG. 1

As described above, the structure (e.g., the score lines and the properties of the various layers and how they are bonded) of the multilayer film of first panel 12 facilitates the opening of the package described in the present application. Such structure also facilitates the adhesive-free characteristic of pour spout 32. FIG. 15 is a first cross-sectional embodiment of the package of FIG. 1, taken along the lines 15-15 of FIG. 1. Package 10 comprises first panel 12 which comprises a multilayer film comprising exterior layer 40 having first score line 24 and interior layer 36 having second score line 26. In the cross-sectional view of package 10, first score line 24 is shown as linear. However, in the plane of package 10, first score line 24 is nonlinear. Package interior 34 is positioned between first panel 12 and second panel 14.

To facilitate the separation of exterior layer 40 and interior layer 36, either or both may include surface contamination for a "contaminated" peel system as known in the art. Alternatively, exterior layer 40 and interior layer 36 may comprise uncontaminated layers comprising materials that have a high affinity to remain bonded in an unopened package but a low affinity to separate when the package is opened. If the package is a stand-up pouch (e.g., as depicted in FIG. 3), minimal stress is placed on the interface between exterior layer 40 and interior layer 36; this facilitates such materials remaining bonded. in general the melting temperature of the materials in exterior layer 40 may be higher than that of the materials in interior layer 36 to ensure that any heat sealing of first panel 12 to second panel 14 does not cause fusion of exterior layer 40, including but not limited to fusion of first score line 24 in exterior layer 40.

In the various embodiments of the package described in the present application, exterior layer 40 may be a monolayer film or a multilayer film. As non-limiting examples, exterior layer 40 may comprise oriented polyester (e.g., oriented polyethylene terephthalate (OPET)), oriented polypropylene (OPP) or nylon including but not limited to blends of nylons and biaxially-oriented nylon (BON). As a further non-limiting example, exterior layer 40 may comprise 48 gauge (approximately 0.48 mil) thickness OPET or 142 gauge (approximately 1.42 mil) thickness OPET. As a further non-limiting example, exterior layer 40 may be a multilayer film comprising 48 gauge (approximately 0.48 mil) thickness OPET coated with 0.02 mil thickness PVdC. In some embodiments, exterior layer 40 may be corona treated (as known in the art) to improve adhesion of exterior layer 40 to other layers in the package. In some embodiments, exterior layer 40 may have a thickness of from about 0.1 mil to about 5.0 mil or from about 0.5 mil to about 1.5 mil.

In the various embodiments of the package described in the present application, interior layer 36 may be a monolayer film or a multilayer film. As non-limiting examples, interior layer 36 may comprise a sealant material, such as polyethylene, ionomer, polyester or blends of such. As a further non-limiting example, interior layer 36 may comprise a multilayer film comprising a sealant material, a tie material and/or a barrier material. As further non-limiting example, interior layer 36 may comprise a 3.0 mil thickness multilayer film comprising a first layer of a blend of LLDPE and LDPE, a second layer of tie material, a third layer of EVOH, a fourth layer of tie material and a fifth layer of a blend of LLDPE and LDPE. As a further non-limiting example, interior layer 36 may comprise a 2.0 mil thickness multilayer film comprising a first layer of a blend of VLDPE and LLDPE, a second layer of tie material, a third layer of EVOH, a fourth layer of tie material and a fifth layer of a blend of EVA and EMAA. In some embodiments, interior layer 36 may be corona treated (as known in the art) to improve adhesion of interior layer 36 to other layers in the package. In some embodiments, interior layer 36 may have a thickness of from about 0.1 mil to about 5.0 mil or from about 2.0 mil to about 3.0 mil.

Figure 16:
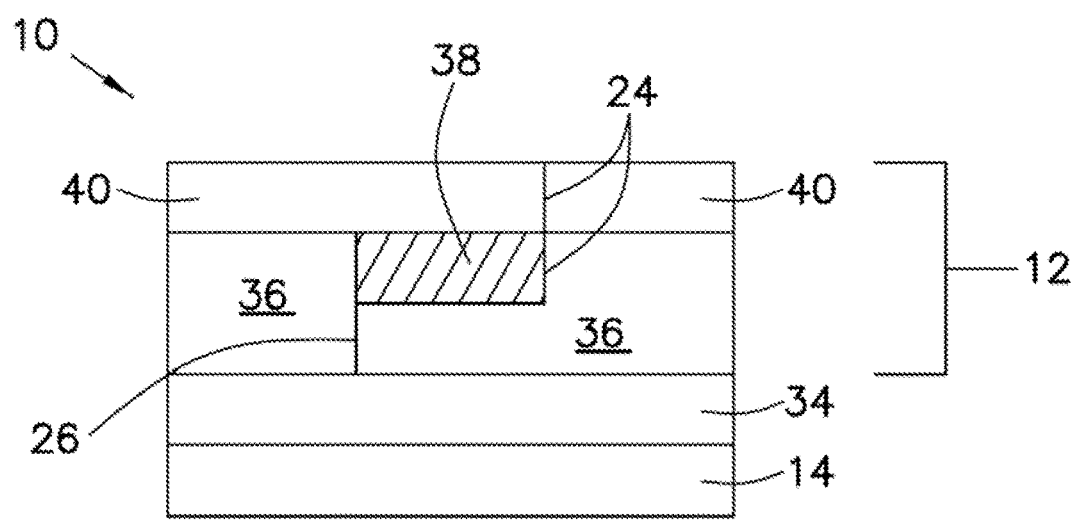
FIG. 16 is a second cross-sectional embodiment of the package of FIG. 1, taken along the lines 15-15 of FIG. 1.

FIG. 16 is a second cross-sectional embodiment of the package of FIG. 1, taken along the lines 15-15 of FIG. 1, First panel 12 comprises a multilayer film comprising exterior layer 40 having first score line 24 and interior layer 36 having second score line 26. Exterior layer 40 and interior layer 36 is each as described above. The multilayer film of first panel 12 further comprises intermediate layer 38 positioned between exterior layer 40 and interior layer 36 in at least first region 28 (i.e., the area between first score line 24 and second score line 26). Intermediate layer 38 is depicted with hatching solely to differentiate the layer. Intermediate layer 38 may comprise a tie material or a release agent. In the embodiment of FIG. 16, first score line 24 scores exterior layer 40 and intermediate layer 38, and second score line scores interior layer 36 only. In other embodiments, first score line 24 may score exterior layer 40 only, and second score line 26 may score interior layer 36 and intermediate layer 38. Package interior 34 is positioned between first panel 12 and second panel 14.

If intermediate layer 38 comprises a tie material, intermediate layer 38 may be positioned coextensive with exterior layer 40 and interior layer 36 and may not be limited to the first region. As used throughout this application, the term "coextensive" refers to the width of one layer being substantially equal to the width of another layer and the longitudinal edges of one layer substantially coinciding with the longitudinal edges of another layer. If intermediate layer 38 comprises a tie material, separation of exterior layer 40 and interior layer 36 may occur by breaking apart intermediate layer 38 and/or a bond between intermediate layer 38 and at least one of the exterior layer 40 and interior layer 36. Permanent, peelable, and fracturable bonds may be engineered into the manufacturing process (e.g., coextrusion, coating lamination, adhesive lamination or blends of such). For example, this three layer structure may establish a relatively permanent bond between exterior layer 40 and intermediate layer 38 which have a greater affinity for one another than the intermediate layer 38 and interior layer 36 which have a lesser affinity, where intermediate layer 38 is common to both exterior layer 40 and interior layer 36. Thus, the lesser affinity between intermediate layer 38 and interior layer 36 relative to intermediate layer 38 and exterior layer 40 produces a relatively peelable bond between intermediate layer 38 and interior layer 36. Alternatively, for example, this three layer structure may establish a relatively permanent bond between interior layer 36 and intermediate layer 38 which have a greater affinity for one another than the intermediate layer 38 and exterior layer 40 which have a lesser affinity where intermediate layer 38 is common to both exterior layer 40 and interior layer 36. Thus, the lesser affinity between intermediate layer 38 and exterior layer 40 relative to intermediate layer 38 and interior layer 36 produces a relatively peelable bond between intermediate layer 38 and exterior layer 40. As a further alternative, this three layer structure may establish a relatively permanent bond between exterior layer 40 and intermediate layer 38 and a relatively permanent bond between intermediate layer 38 and interior layer 36. This produces a fracturable bond in intermediate layer 38. Selection of the various materials for exterior layer 40, intermediate layer 38 and interior layer 36 determines the nature of the bond, i.e., whether it is permanent, peelable, fracturable or blends of such.

Suitable polymers for use with interior layer 36 include both polymer-type material such as ethylene homopolymers and polymers as well as ionomer type material. Examples of suitable polymers include ethylene vinyl acetate copolymer (EVA), ethylene alpha-olefin copolymers, linear low density polyethylene (LLDPE), low density polyethylene (LDPE), very low density polyethylene (VLDPE), neutralized ethylene acid copolymer, plastomers, ethylene acrylate copolymer, ethylene methyl acrylate copolymer and zinc or sodium salts of partially or completely neutralized ethylene-methacrylate acid copolymers. Interior layer 36 beneficially uses heat sealable materials.

Intermediate layer 38 as a tie material may be selected to have a relatively low peel strength when peelably bonded to one of either exterior layer 40 or interior layer 36 or a relatively low cohesive strength in itself. In one embodiment, intermediate layer 38 as a tie material is typically comprised of a blend of from about 5% to about 30% by weight polybutylene and another constituent, such as ethylene vinyl acetate copolymer, ethylene copolymers with $C_4$-$C_8$ alpha olefin, linear low density polyethylene (LLDPE), ionomers, neutralized ethylene acid copolymer or unneutralized ethylene acid copolymer and mixtures thereof. As used throughout this application, the term "polybutylene" includes having polymeric units derived from butene-1 as the major (at least 75% or at least 80% polymeric units). A non-limiting example of a polybutylene is a random copolymer of butene-1 with low ethylene content having a density of 0.906 g/cm$^3$, a melt index of 1.0 g/1 0 min (190° C./2.16 kg) and a melting point of 97° C., which is commercially available from LyondellBasell Industries N.V., (The Netherlands) under the trade name PB 8640M.

In another embodiment, intermediate layer 38 as a tie material may be comprised of a pressure sensitive adhesive (PSA) (as further described below). In this embodiment, intermediate layer 38 not only enables the package to be opened, exterior layer 40 and interior layer 36 to be separated and adhesive free pour spout 32 to be formed, but also enables exterior layer 40 and interior layer 36 to be reattached in first region 28. (Reattachment and reclose further described below.) in such embodiment, a PSA with adhesive failure (i.e., with intermediate layer 38 remaining with interior layer 36 when exterior layer 40 and interior layer 36 are separated) may be preferred. A non-limiting example of a PSA includes an extrudable pressure sensitive hot melt adhesive having a density of 0.96 g/cm$^3$ and a melt index of approximately 8.0 g/10 min (190° C./2.16 kg), which is commercially available from Bostik Findley, Inc. (Wauwatosa, Wis.) under the trade name Hot Melt Reclose M3156/T. A further non-limiting example of PSA is an extrudable pressure sensitive hot melt adhesive having a density of 0.96 g/cm$^3$ and a melt index of approximately 45.0 g/10 min (190° C/2.16 kg), which is commercially available from Bostik Findley, Inc. (Wauwatosa, Wis.) under the trade name Hot Melt Reclose M651.

If intermediate layer 38 comprises release agent, intermediate layer 38 is positioned between exterior layer 40 and interior layer 36 in first region 28. The release agent may be solvent-based or water based and may be silicone, release varnish, release lacquer or any other release agent. A non-limiting example of a release agent is Flexcon release lacquer RMW/94546, which is commercially available from Flint Group (Luxembourg). A further non-limiting example of a release agent is FSBM1B6DB, which is commercially available from Siegwerk Druckfarben AG & Co. KGaA (Siegburg, Germany).

Figure 17:
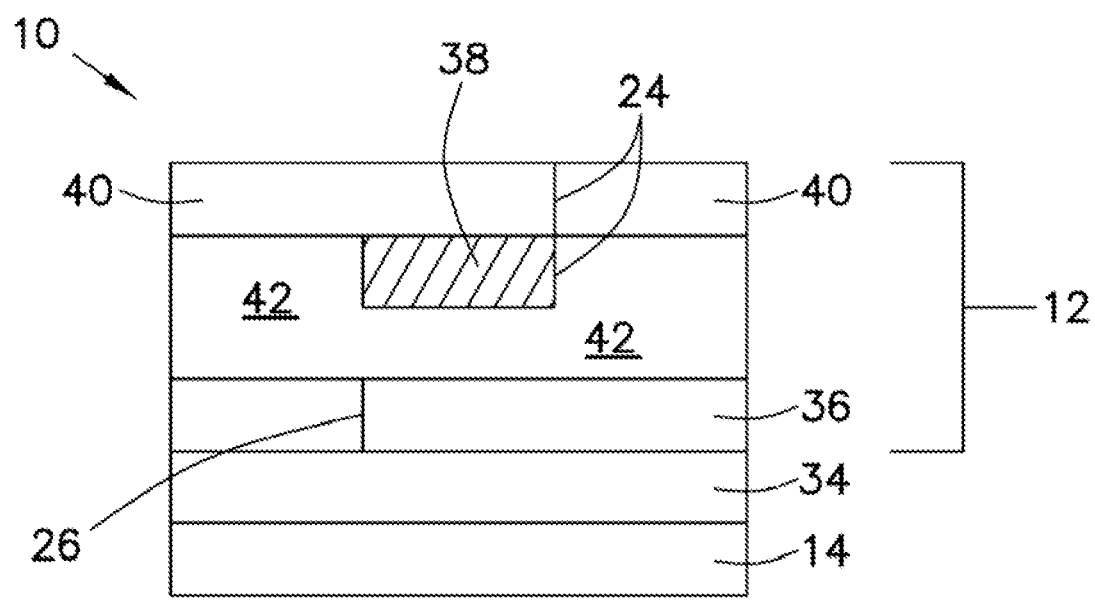
FIG. 17 is a third cross-sectional embodiment of the package of FIG. 1, taken along the lines 15-15 of FIG. 1.

FIG. 17 is a third cross-sectional embodiment of the package of FIG. 1, taken along the lines 15-15 of FIG. 1. First panel 12 comprises a multilayer film comprising exterior layer 40 having first score line 24 and interior layer 36 haying second score line 26. The multilayer film of first panel 12 further comprises intermediate layer 38. In this embodiment, intermediate layer 38 comprises a release agent to facilitate the separation of exterior layer 40 and interior layer 36 and is positioned between exterior layer 40 and interior layer 36 in first region 26 (i.e., the area between first score line 24 and second score line 26). Intermediate layer 38 is depicted with hatching solely to differentiate the layer. Exterior layer 40, interior layer 36 and the release agent of intermediate layer 38 is each as described above. In the embodiment of FIG. 17, the multilayer film of first panel 12 further comprises flood connecting layer 42 positioned between the release agent of intermediate layer 38 and interior layer 36 in first region 28. In this embodiment, flood connecting layer 42 is also positioned between exterior layer 40 and interior layer 36 in a second region outside first region 28. In the embodiment of FIG. 17, first score line 24 scores exterior layer 40 and intermediate layer 38, and second score line 26 scores interior layer 36 only. In other embodiments, first score line 24 may score exterior layer 40 only, and second score line 26 may score more than one layer. Package interior 34 is positioned between first panel 12 and second panel 14.

Flood connecting layer 42 is a laminating adhesive which serves to join or connect exterior layer 40 and interior layer 36. The laminating adhesive may be solvent-based or water-based and may be one of many laminating adhesives known in the art. A non-limiting example of a laminating adhesive is a ready-to-use, formaldehyde-free, waterborne acrylic adhesive for use in the manufacture of flexible film laminates for food packaging, which is commercially available from The Dow Chemical Company (Midland, Mich.) under the trade name Robond™ L-90D. A further non-limiting example of a laminating adhesive is a PVdC emulsion for use as a barrier-type adhesive, which is commercially available from The Dow Chemical Company (Midland, Mich.) under the trade name Serfene™ 2010.

Figure 18:
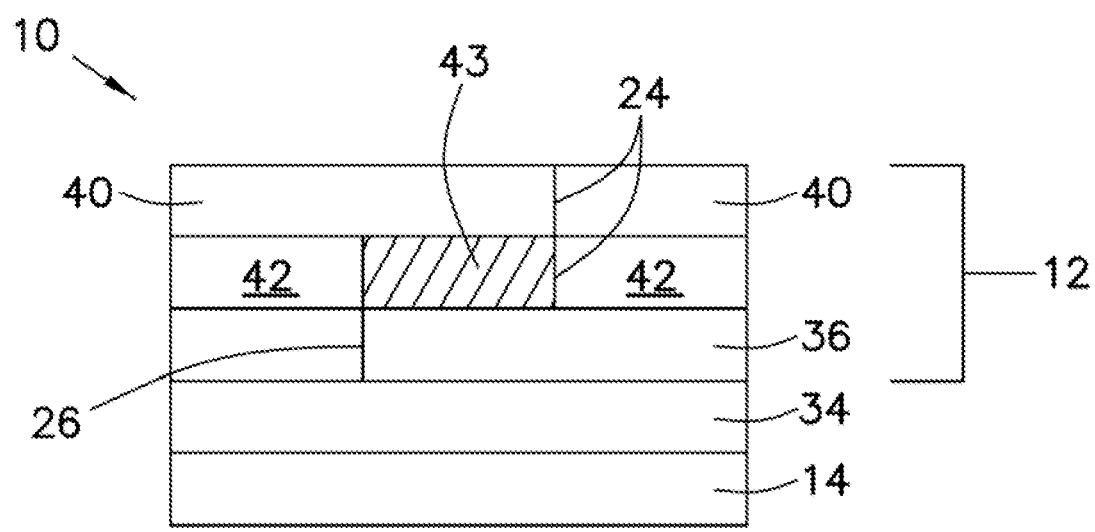
FIG. 18 is a fourth cross-sectional embodiment of the package of FIG. 1, taken along the lines 15-15 of FIG. 1.

FIG. 18 is a fourth cross-sectional embodiment of the package of FIG. 1, taken along the lines 15-15 of FIG. 1.

First panel 12 comprises a multilayer film comprising exterior layer 40 having first score line 24 and interior layer 36 having second score line 26. The multilayer film of first panel 12 further comprises connection-free layer 43 positioned between exterior layer 40 and interior layer 36 in first region 28 (i.e., the area between first score line 24 and second score line 26). The multilayer film of first panel 12 also comprises flood connecting layer 42 positioned between exterior layer 40 and interior layer 36 in a second region outside first region 28. Connection-free layer 43 is depicted with hatching solely to differentiate the layer. Exterior layer 40, interior layer 36 and flood connecting layer 42 is each as described above. In the embodiment of FIG. 18, first score line 24 scores exterior layer 40 and connection-free layer 43, and second score line 26 scores interior layer 36 only. In other embodiments, first score line 24 may score exterior layer 40 only, and second e line 26 may score more than one layer. Package interior 34 is positioned between first panel 12 and second panel 14.

In the embodiment of FIG. 18, flood connecting layer 42 may comprise a laminating adhesive that is pattern-applied (i.e., not applied to first region 28) to form connection-free layer 43. in this embodiment, flood connecting layer 42 is not positioned in first region 28. Connection-free layer 43 serves the purpose of, is equivalent to and replaces the release agent of intermediate layer 38. For example, connection-free layer 43 facilitates separation of exterior layer 40 and interior layer 36.

Figure 19:
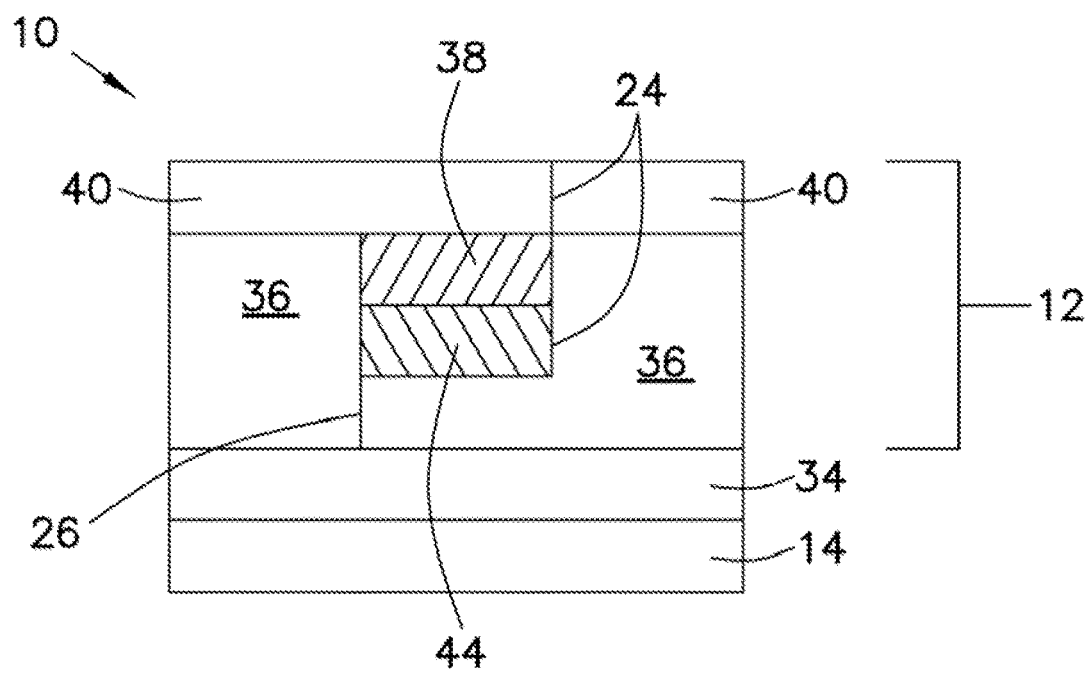
FIG. 19 is a fifth cross-sectional embodiment of the package of FIG. taken along the lines 15-15 of FIG. 1.

FIG. 19 is a fifth cross-sectional embodiment of the package of FIG. 1, taken along the lines 15-15 of FIG. 1. First panel 12 comprises a multilayer film comprising exterior layer 40 having first score line 24 and interior layer 36 having second score line 26. The multilayer film of first panel 12 further comprises intermediate layer 38. In this embodiment, intermediate layer 38 comprises a release agent to facilitate the separation of exterior layer 40 and interior layer 36 and is positioned between exterior layer 40 and interior layer 36 in first region 28 (i.e., the area between first score line 24 and second score line 26). Exterior layer 40, interior layer 36 and the release agent of intermediate layer 38 is each as described above. In this embodiment, the multilayer film of first panel 12 further comprises pattern connecting layer 44 to further facilitate the separation of exterior layer 40 and interior layer 36. Pattern connecting layer 44 is positioned between the release agent of intermediate layer 38 and interior layer 36 in first region 28. Intermediate layer 38 and pattern connecting layer 44 is each depicted with hatching solely to differentiate the layers. In the embodiment of FIG. 19, first score line 24 scores exterior layer 40, intermediate layer 38 and pattern connecting layer 44, and second score line 26 scores interior layer 36 only. In other embodiments, first score line 24 may score exterior layer 40 only, and second score line 26 may score more than one layer. Package interior 34 is positioned between first panel 12 and second panel 14.

Pattern connecting layer 44 comprises a removable adhesive. Removable adhesives are designed to form temporary bonds and can be removed after hours, days, months or years. Some removable adhesives are designed to repeatedly separate and reattach. A non-limiting example of a removable adhesive is a pressure sensitive adhesive (PSA). Non-limiting examples of pressure sensitive adhesives (PSA) include but are not limited to those compositions that comprise a base elastomeric resin and a tackifier to enhance the ability of the adhesive to instantly bond and to enhance the bond strength. Examples of elastomers used as the base resin in tackified multicomponent PSA include but are not limited to natural rubber, polybutadiene, polyorganosiloxanes, styrene-butadiene rubber, carboyxlated styrene-butadiene rubber, polyisobutylene, butyl rubber, halogenated butyl rubber, block polymers based on styrene with isoprene, butadiene, ethylene-propylene or ethylene-butylene, or combinations of such elastomers. (See Yorkgitis, "Adhesive Compounds," Encyclopedia of Polymer Science and Technology, Third Edition, 2003, Volume 1, pp. 256-290 (John Wiley & Sons, Inc., Hoboken, N.J.), which is incorporated in its entirety in this application by this reference.) A non-limiting example of a PSA includes a coater-ready, water-based acrylic emulsion having a density of 1.03 g/cm$^3$ and a Brookfield LVF Viscosity of 300 cps (#3 spindle, 50 RPM at 25 C) which is commercially available from The Dow Chemical Company (Midland, Mich.) under the trade name Robond™ PS-68 Adhesive. Pattern connecting layer 44 remains attached to interior layer 36 when exterior layer 40 and interior layer 36 are separated. This ensures that pour spout 32 (as described above) is adhesive-free. An adhesive-free pour spout assists a consumer in avoiding contact with an adhesive when reaching into the package. Additionally, an adhesive-free pour spout assists a consumer in pouring or dispensing articles from the package without such articles contacting an adhesive.

Pattern connecting layer 44 also enables exterior layer 40 and interior layer 36 to be reattached in first region 28. Such reattachment recloses the package and preserves the package contents for later use. As a non-limiting example, a consumer opens package 10 of FIG. 1 and FIG. 14 (and, e.g., FIG. 19) by grasping first region 28 of first panel 12 near first score line 24 and moving First region 28 towards second score line 26. Such movement causes exterior layer 40 and interior layer 36 to separate in first region 28. It further causes first end 90 of first score line 24 to intersect (indirectly with a propagated tear) first point 60 of second score line 26 and second end 92 of first score line 24 to intersect (indirectly with a propagated tear) second point 62 of second score line 26. This exposes, ruptures or severs second score line 26 and forms opening 30 in package 10. It also forms adhesive-free pour spout 32 from the portion of exterior layer 40 in first region 28. To access the contents of opened package 10, the consumer may reach through opening 30 into package interior 34 of package 10 or use pour spout 32 (in first region 28) to dispense or pour the contents from package interior 34 of package 10. Once the desired contents are removed, a consumer may, for example, grasp first edge 16 with one hand and second edge 18 with the other hand in the region of second score line 26 and pull the edges gently away from one another. Such action effectively cinches, recloses or reseals package 10. Alternative consumer methods of reclose are known and included in this application. In some embodiments, such as second alternate package 210 (see FIG. 3), second alternate first seal 216 and second alternate second seal 218 each provides a flange or flap to assist with reclose. However, such flange or flap is not necessary for reclose; other embodiments of the package described in the application do not include such flange or flap and still efficiently and effectively reclose.

Figure 20:
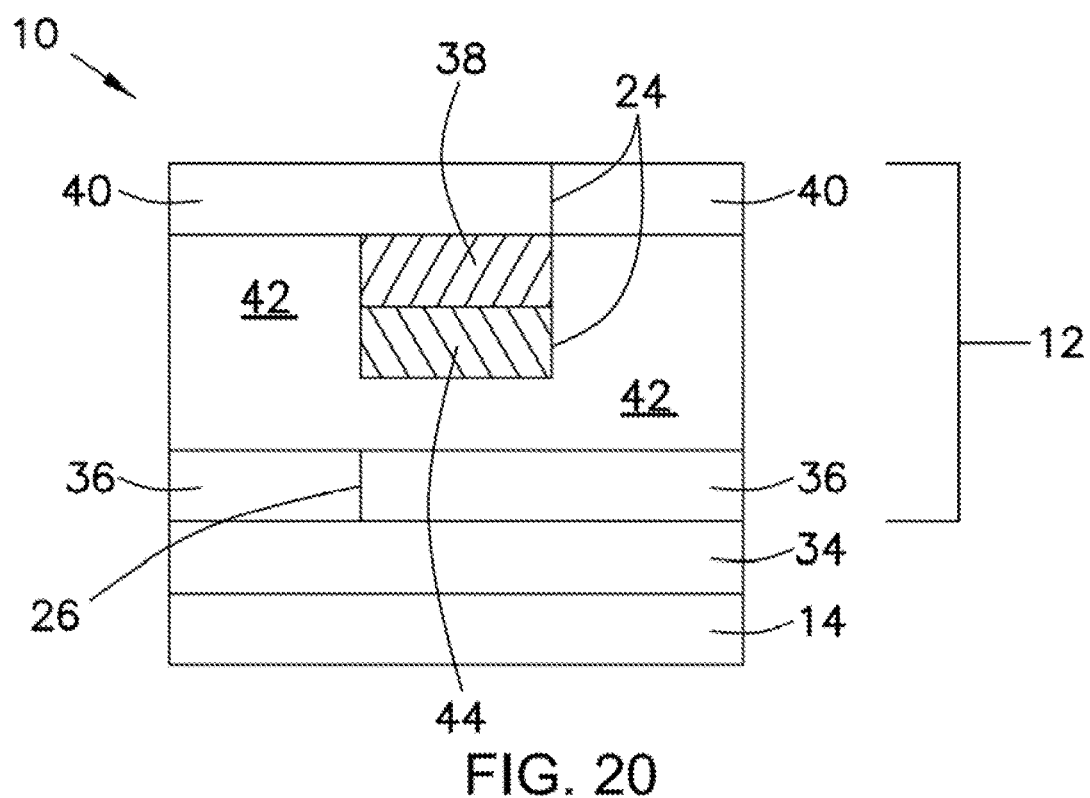
FIG. 20 is a sixth cross-sectional embodiment of the package of FIG. 1, taken along the lines 15-15 of FIG. 1.

FIG. 20 is a sixth cross-section embodiment of the package of FIG. 1, taken along the lines 15-15 of FIG. 1. First panel 12 comprises a multilayer film comprising exterior layer 40 having first score line 24 and interior layer 36 having second score line 26. The multilayer film of first panel 12 further comprises intermediate layer 38. In this embodiment, intermediate layer 38 comprises a release agent to facilitate the separation of exterior layer 40 and interior layer 36 and is positioned between exterior layer 40 and interior layer 36 in first region 28 (i.e., the area between first score line 24 and second score line 26). In this embodiment, the multilayer film of first panel 12 further comprises pattern connecting layer 44 to facilitate the separation (and reattachment) of exterior layer 40 and interior layer 36 and is positioned between the release agent of intermediate layer 38 and interior layer 36 in first region 28. The multilayer film of first panel 12 also further comprises flood connecting layer 42 positioned between pattern connecting layer 44 and interior layer 36 in first region 28 and positioned between exterior layer 40 and interior layer 36 in a second region outside first region 28. Intermediate layer 38 and pattern connecting layer 44 is each depicted with hatching solely to differentiate the layers. Exterior layer 40, interior layer 36, the release agent of intermediate layer 38, pattern connecting layer 42 and flood connecting layer 44 is each as described above. In the embodiment of FIG. 20, first score line 24 scores exterior layer 40, intermediate layer 38 and pattern connecting layer 44, and second score line 26 scores interior layer 36 only. In other embodiments, first score line 24 may score exterior layer 40 only, and second score line 26 may score more than one layer. Package interior 34 is positioned between first panel 12 and second panel 14.

In the embodiment of FIG. 20, for example, the separation of exterior layer 40 and interior layer 36 may be facilitated by first score line 24, second score line 26 and the characteristics of the release agent of intermediate layer 38, the removable adhesive of pattern connecting layer 44 and the laminating adhesive of flood connecting layer 42. For example, the release agent may be solvent-based while the removable adhesive and the laminating adhesive may be water-based. The water-based removable adhesive and the water based laminating adhesive have a greater affinity for one another than the solvent-based release agent. As a result, separation between the release agent and the removable adhesive is further facilitated.

The package described in the present application may include any of various packaging configurations (see, e.g., FIGS. 1-4), any of various score line configurations (see, e.g., FIG. 1, FIGS. 5-12) and/or any of various first panel multilayer films (see, e.g., FIGS. 15-20). For example, a package may include the packaging configuration and score line configuration described in FIG. 1 and the first panel multilayer film described in FIG. 20. FIG. 14 provides a perspective side view of such package in an open state.

A consumer opens such a package by grasping first region 28 of first panel 12 near first score line 24 and moving first region 28 towards second score line 26. Such movement causes exterior layer 40 and interior layer to separate in first region 28. More specifically, it causes exterior layer 40 and the release agent of intermediate layer 38 to separate from pattern connecting layer 44, flood connecting layer 42 and interior layer 36. It further causes first end 90 of first score line 24 to intersect (indirectly with a propagated tear) first point 60 of second score line 26 and causes second end 92 of first score line 24 to intersect (indirectly with a propagated tear) second point 62 of second score line 26. This exposes, ruptures or severs second score line 26 and forms opening 30 in the package. It also forms adhesive-free pour spout 32 from the portion of exterior layer 40 and the release agent of intermediate layer 38 in first region 28. To access the contents of the opened package, the consumer may reach through opening 30 into package interior 34 or use pour spout 32 (in first region 28) to dispense or pour the contents from package interior 34. Once the desired contents are removed, a consumer may, for example, grasp first edge 16 with one hand and second edge 18 with the other hand in the region of second score 26 and pull the edges gently away from one another. Such action effectively cinches, recloses or reseals the package, resealing exterior layer 40 and the release agent of intermediate layer 38 to pattern connecting layer 44, flood connecting layer 42 and interior layer 36 in first region 28.

Figure 21:
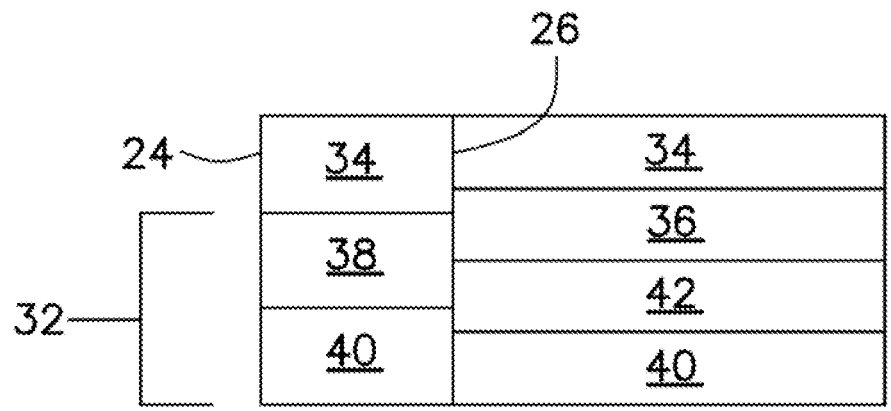
FIG. 21 is a cross-sectional view of the open package of FIG. 14, taken along the lines 21-21 of FIG. 14
Figure 22:
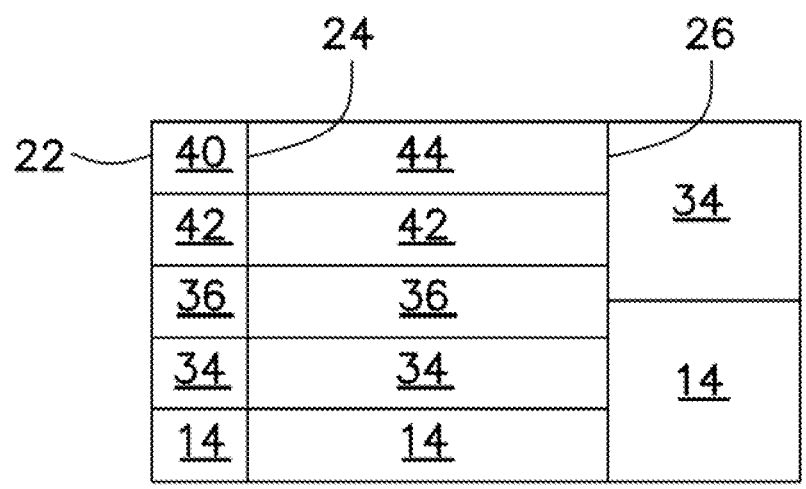
FIG. 22 is a cross-sectional view of the open package of FIG. 14, taken along the lines 22-22 of FIG. 14.

When such package is opened, an altered first panel and an altered second panel are formed. FIG. 21 is a cross-sectional view of the open package of FIG. 14, taken along the lines 21-21 of FIG. 14. (Such package includes the first panel multilayer film described in FIG. 20.) FIG. 21 provides a cross-section of package interior 34 toward the altered first panel. Such altered first panel includes first score line 24 and second score line 26. The structure of the open package and altered first panel between first score line 24 and second score line 26 includes package interior 34 and exterior layer 40 with the release agent of intermediate layer 38 positioned between package interior 34 and exterior layer 40. Exterior layer 40 and the release agent of intermediate layer 38 form pour spout 32. The structure of the open package and altered first panel on the other side of second score line 26 includes package interior 34, interior layer 36 and exterior layer 40 with flood connecting layer 42 positioned between interior layer 36 and exterior layer 40. FIG. 22 is a cross-sectional view of the open package of FIG. 14, taken along the lines 22-22 of FIG. 14. (As above, such package includes the first panel multilayer film described in FIG. 20). FIG. 22 provides cross-section of package interior 34 toward the altered second panel. Such altered second panel includes fourth edge 22, first score line 24 and second score line 26. The structure of the open package and altered second panel between fourth edge 22 and first score line 24 includes exterior layer 40 and interior layer 36 with flood connecting layer 42 positioned between exterior layer 40 and interior layer 36. This structure also includes package interior 34 positioned between interior layer 36 and second panel 14. The structure of the open package and altered second panel between first score line 24 and second score line 26 includes pattern connecting layer 44 and interior layer 36 with flood connecting layer 42 positioned between pattern connecting layer 44 and interior layer 36. This structure also includes package interior 34 positioned between interior layer 36 and second panel 14. The structure of the open package a d altered second panel on the other side of second score line 26 includes package interior 34 and second panel 14.

In the package described in the present application, second panel 14 is a flexible film. As such, second panel 14 may be, for example, a flexible film, a formed flexible film or tray (with first panel 12 as a lidding film), thermoformed flexible film or tray (with first panel 12 as a lidding film) or any other flexible film configuration known in the art. If second panel 12 is a semi-rigid or rigid film, the opening of the package is two-dimensional, not three-dimensional. As a result, if second panel 12 is a semi-rigid or rigid film, the opening and pour spout are ineffective.

Second panel 14 may comprise a multilayer film having the same or different structure as first panel 12 (as described above). For example, second panel 14 may comprise a multilayer film having exterior layer 40 without first score line 24, interior layer 36 without second score line 26 and flood connecting layer 44 positioned between exterior layer 40 and interior layer 36. As the package is opened and optionally reclosed via the structure of the multilayer film of first panel 12, second panel 14 optionally does not include first score line 24, second score line 26, intermediate layer 38 or pattern connecting layer 44.

The various embodiments of the package described in the present application may include means to indicate whether the package has been previously opened or whether the integrity of the package has been comprised. Such means are also known as "tamper-evident" features. For example, means for indicating package integrity include a tamper evident tab with one or more ink layers initially included on interior layer 36 prior to the package being opened for a first time. When the package is first opened, at least one of the ink layers is transferred to exterior layer 40. Tamper-evidence is indicated by a misalignment of interior layer 36 with an image on exterior layer 40 after exterior layer 40 and interior layer 36 are reattached in the first region.

Figure 23:
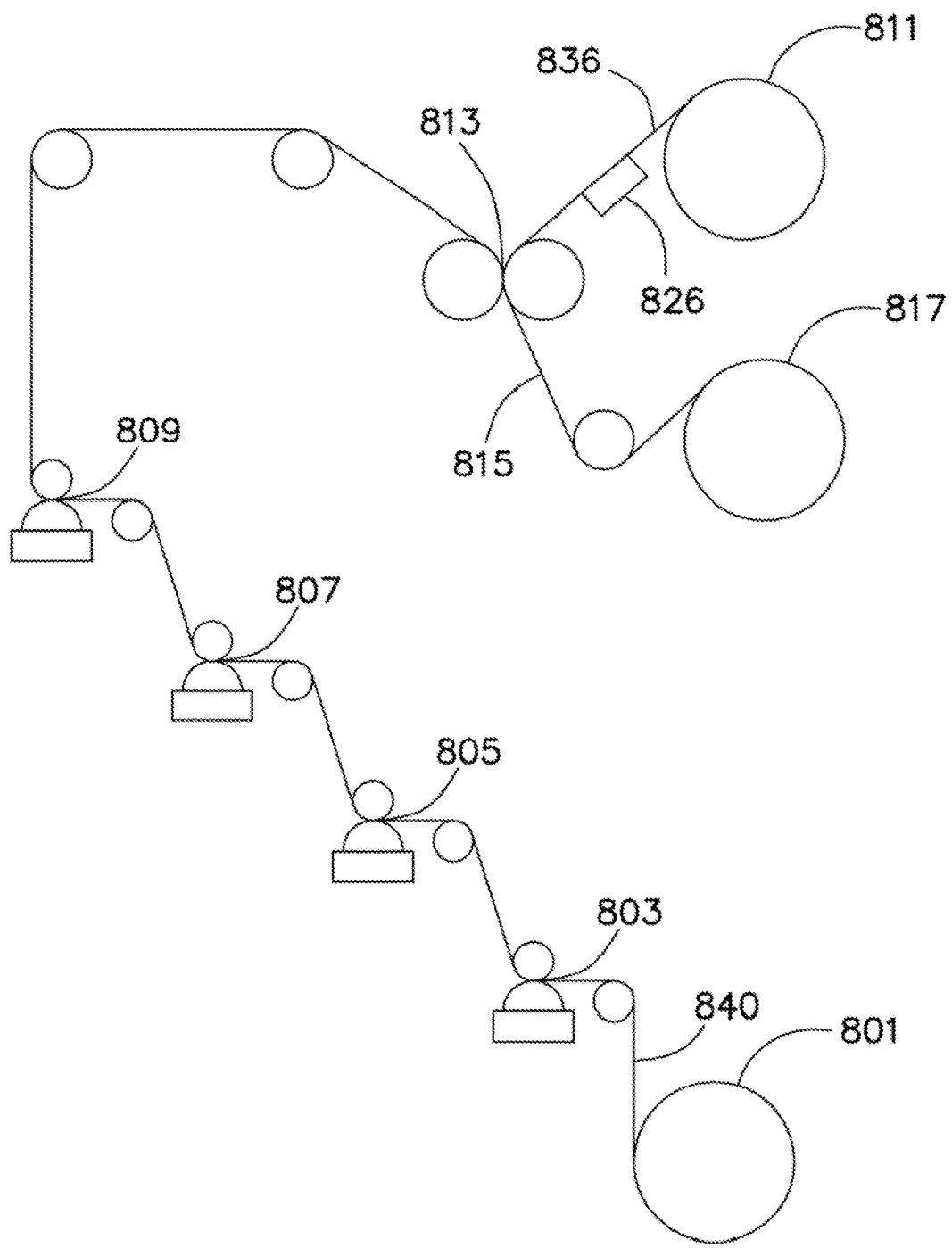
FIG. 23 is a schematic view of a method of manufacturing the film of FIG. 20.

The multilayer film for the package described in the present application may be manufactured via various methods including but not limited to blown film coextrusion, slot cast coextrusion, extrusion coating, adhesive lamination or extrusion lamination. In some embodiments adhesive lamination on a rotogravure press or flexographic press may be preferred. FIG. 23 is a schematic view of a method of manufacturing the film of FIG. 20. FIG. 23 depicts adhesive lamination using a rotogravure press laminator. First input roll 801 carries exterior layer film 840, while second input roll 811 carries interior layer film 836.

Exterior layer film 840 unrolls from first input roll 801. As an optional first step, exterior layer film 840 may first pass through first rollers 803 which comprise a printing apparatus, such as a rotogravure printer or the like for printing, coating or otherwise applying graphics and/or indicia on exterior layer film 840 by applying inks to a surface of exterior layer film 840. Exterior layer film 840 with the optional graphics then passes through second rollers 805 which comprise any suitable device capable of accurately printing, coating or otherwise applying the release agent of intermediate layer 38. For example, the release gent of intermediate layer 38 may be applied via printing apparatus. The release agent is pattern-applied only to the area of the film which will function as the first region in the finished package.

Following second rollers 805, exterior layer film 840 now with the optional graphics and the release agent of intermediate layer 38 passes through third rollers 807, which comprise any suitable device capable of accurately printing, coating or otherwise applying the material for pattern connecting layer 44. For example, third rollers 807 may comprise a roll that picks up the material for pattern connecting layer 44 from a reservoir on the outer surface of the roll. A doctor blade may be used to scrape off any excess material. As above, this material is pattern-applied only to the area of the film which will function as the first region in the finished package. In this embodiment, the material for pattern connecting layer 44 is applied over the release agent applied at second rollers 805. At the fourth rollers 809, the material for flood connecting layer 42 is printed, coated or otherwise applied to the entire width of exterior layer film 840 with the optional graphics, the release agent of intermediate layer 38 and material for pattern connecting layer 44. In other words, the material for flood connecting layer 42 is not pattern-applied but flood-coated on the film. The material for flood connecting layer 42 is applied in such a manner that a sufficiently large proportion of the surface is covered by the material of flood connecting layer 42. This permits exterior layer film 840 (with the additional layers as described) to be adhesively attached to interior layer film 836 at fifth rollers 813. An exemplary device suitable for applying the material for flood connecting layer 42 is one similar to that described above for applying the material for pattern connecting layer 44.

Optional dryers (not shown) may be positioned between optional first rollers 803 and second rollers 805, second rollers 805 and third rollers 807, third rollers 807 and fourth rollers 809, and/or fourth rollers 809 and fifth rollers 813.

Prior to entering fifth rollers 813, interior layer film 836 passes through second store station 826. Second score station 826 creates what will be second score line 26 in the finished package. Second score station 826 mechanically scores interior layer film 836 continuously in the machine direction via a blade. Other embodiments(as described below) include alternative means for providing second score line 26.

At fifth rollers 813 exterior layer film 840 with the additional layers (i.e., optional graphics, the release agent of intermediate layer 38, the material for pattern connecting layer 44, and the material for flood connecting layer 42) and the scored interior layer film 836 are laminated to each other. The web of laminated film 815 is then rolled on output roll 817. Laminated film 815 is then advanced from output roll 817 to a first laser ablation station (not shown in FIG. 23) at which the side of laminated film 815 forming exterior layer 40 in the finished package is scored to create what will be first score line 24 in the finished package. The first laser ablation station may comprise a laser, a sensor and/or other suitable devices. The sensor may detect a feature, such as an eye mark, on the laminated film so that the ablation by laser is in registration with the parameters of the package design based on signals from the detector, as known in the art. For example, optional graphics or printed inks may provide a back stop for the laser.

The first laser ablation station may score to various depths. For example, first laser ablation station may score through exterior layer 40 only or first laser ablation station may score through exterior layer 40, the release agent of intermediate layer 38 and the material for pattern connecting layer 44 or first laser ablation station may score to other depths. The depth of the score formed by the laser may be regulated by regulating the power output or beam intensity of the laser beam, the width or spot size of the laser beam and/or the amount of time a given spot on the film surface is irradiated by the beam. These factors generally are selected based on the characteristics of the material being ablated. As known in the art, some materials are more readily ablated by lasers than other materials. For example, many conventional polymeric materials are known to be very receptive to absorbing focused laser energy, typically focused infrared radiation. These polymeric materials include, for example, oriented polyethylene terephthalate (OPET), biaxially oriented nylon (BON), nylon, paper, cellophane, polyvinylidene chloride copolymer (PVdC) or ethylene vinyl alcohol copolymer (EVOH). However, certain other thermoplastic polymers are not as susceptible to infrared laser energy, such as polyolefins such as low density polyethylene (LDPE) and polypropylene and may require a greater intensity for the laser beam and/or a greater amount of time for irradiation.

In various embodiments of the package described in the present application, it may be advantageous to score the exterior layer 40 side of the laminate via laser and to score the interior layer 36 side of the laminate via mechanical blade, as described above. This can be advantageous, for example, when the material of exterior layer 40 is readily scored by a laser but the material of interior layer 36 is not. For instance, when exterior layer 40 comprises OPET, it may readily be scored with a laser; but when interior layer 36 comprises a polyethylene heat seal layer, laser scoring may not be the best choice, as polyethylene does not score well with a laser. In this case, blade cutting or other mechanical process may be used to score interior layer 36.

In other embodiments, second score station 826 may be omitted in the rotogravure press laminator; and the interior layer 36 side of laminated film 815 may also be scored by laser to create what will be second score line 26 in the finished package. Such process would be similar to that described above for laser-scored first score line 24 and would result in a two-side laser score. As an alternative, first score line 24 may be formed inline on the rotogravure press laminator or off-line via mechanical or chemical means.

After the scoring operations, laminated film 815 may be sent to a reel-up (not shown in FIG. 23) and wound into a roll for subsequent processing. Laminated film 815 may also be slit into plurality of partial widths and wound into multiple rolls. In this latter instance, each partial width would have recurring patterns of the release agent for intermediate layer 38, the material for pattern connecting layer 44, first score line 24 and second score line 26.

Figure 24:
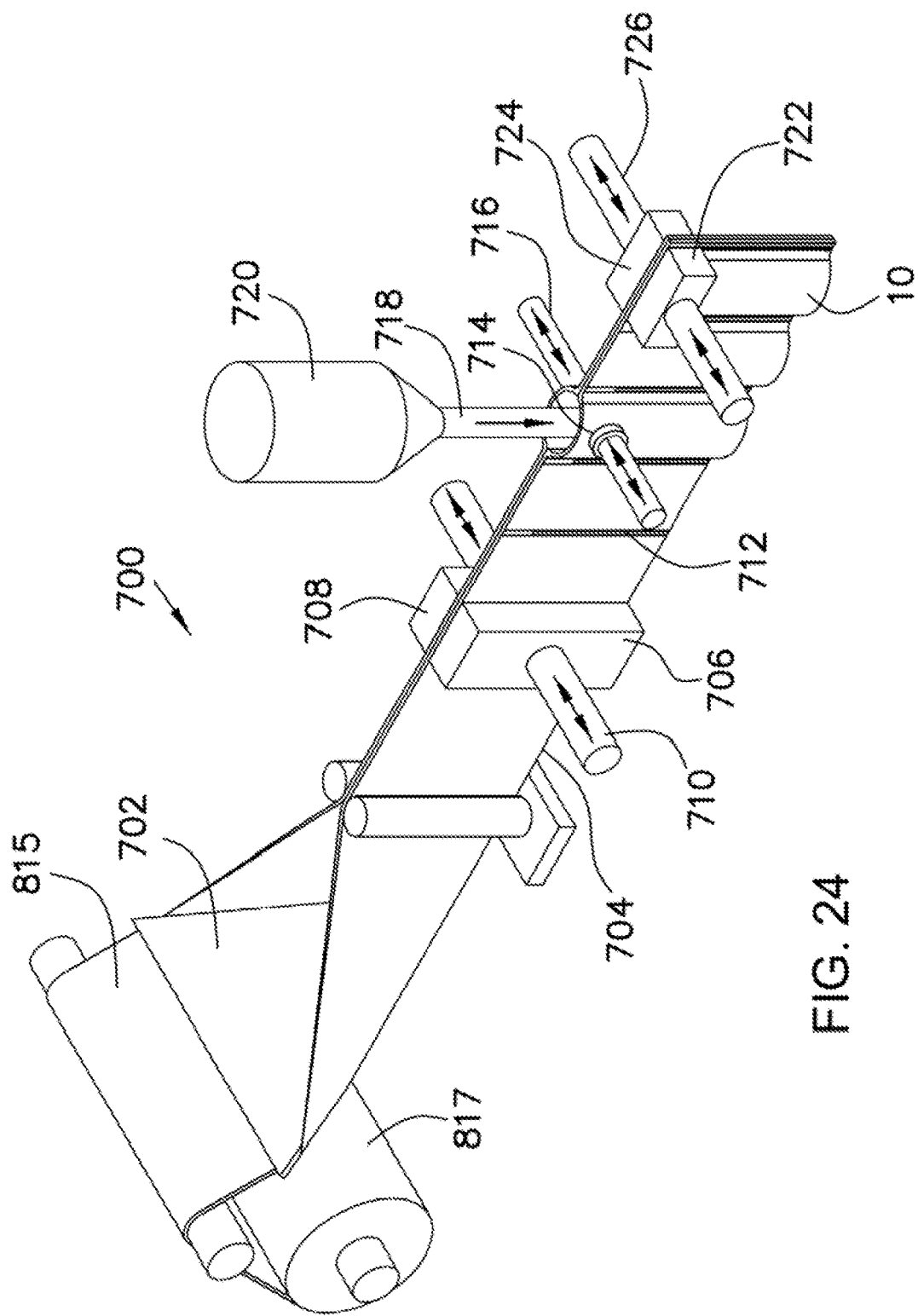
FIG. 24 is a perspective view of a method of producing the package of FIG. 1.

A web of laminated film 815 may be used to produce filled packages. Such packages may be produced and filled via a vertical form-fill-seal machine, a horizontal form-fill-seal machine or other means known in the art. In some embodiments, a horizontal form-fill-seal machine may be preferred. FIG. 24 is a perspective vie of a method of producing the package of FIG. 1. A horizontal form-fill-seal machine 700 is depicted and includes output roll 817 of web of laminated film 815 manufactured from the method depicted in FIG. 23 and described above. In FIG. 24, the web of laminated film 815 is folded generally in half by former 702 at a forming station and aligned to provide first panel 12 and second panel 14 (not depicted with reference number in FIG. 24) with fold 704 at the area of third edge 20 (not depicted with reference number in FIG. 24).

Following the forming station, a first sealing station is provided with first sealing element 706 and first backing element 708 mounted on pair of first rods 710. The pair of first rods 710 is adapted to be extended and retracted in any desired manner (not depicted) so that when extended, first sealing element 706 and first backing element 708 engage the web of finished film 815,o seal together first panel 12 and second panel 14 for generally the entire height to form first edge 16 and second edge 18 (not depicted in FIG. 24 with reference number) on contiguous pouches and simultaneously form slit 712, which extends from fold 704 for a distance less than the full height of the pouch.

The pouch is moved to a filling station where the pouch is opened in any desired manner, for example, by suction cups 714 mounted on pair of second rods 716 connected to a source of suction (not depicted). Fill tube 718, which may be fixed or movable, communicates with hopper 720, which is located above the opened pouch. A quantity of material from hopper 720 passes through fill tube 718 and into the pouch. The quantity of material may be regulated in any desired manner, for example, by conventional valves or the like (not depicted).

The pouch is then moved to a second sealing station. The second sealing station includes second sealing element 722 and second backing element 724 mounted on extendable and retractable pair of third rods 726. Second sealing element 722 and second backing element 724 engage the web of finished film 815 to seal together first panel 12 and second panel 14 to form fourth edge 22 (not depicted in FIG. 24 with reference number). The second sealing station simultaneously separates an individual sealed pouch from the line of contiguous pouches by severing portions of material in alignment with slit 712. The package 10 may then be placed on a conveyor or the like and moved to a packaging and/or shipping area.

The above description, examples and embodiments disclosed are illustrative only and should not be interpreted as limiting. The present invention includes the description, examples and embodiments disclosed; but it is not limited to such description, examples or embodiments. Modifications and other embodiments will be apparent to a person of ordinary skill in the art, and all such modifications and other embodiments are intended and deemed to be within the scope of the present invention as defined by the claims.

What is claimed is as follows:

1. A package comprising a first panel, a second panel, a first edge connecting the first panel and the second panel, a second edge connecting the first panel and the second panel, a third edge connecting the first panel and the second panel and a fourth edge connecting the first panel and the second panel;

wherein the first panel comprises a multilayer film comprising an exterior layer having a nonlinear first score line having a flat end and a second end, wherein each of the first end and the second end is positioned in the first panel and wherein the exterior layer is adjacent to each of the first edge, the second edge, the third edge, and the fourth edge of the first and second panels, an interior layer having a linear second score line having a first point spaced apart from a second point, and a first region defined by an area between the first score line and the second score line, wherein the exterior layer and the interior layer are adapted to be separated in the first region, wherein the first score line and the second score line are positioned non-parallel in a plane of the package such that the first score line intersects the second score line at each of the first point and the second point to form an opening in the package at the second score line when the exterior layer and the interior layer are separated and wherein the exterior layer forms an adhesive-free portion that remains hingedly and integrally attached to a remainder of the exterior layer at the opening, wherein the adhesive-free portion is positioned between the opening and the third edge when the exterior layer and the interior layer are separated; and wherein the second panel is a flexible film and wherein the third edge comprises:

a) a gusset member formed or plowed in a fold between and connecting the first panel and the second panel, or b) a gusset member inserted and sealed between and connecting the first panel and the second panel.

2. The package of claim 1 wherein the first end of the first score line is positioned adjacent to the first edge, the second edge, the third edge, or the fourth edge.

3. The package of claim 1 wherein the second end of the first score line is positioned adjacent to the first edge, the second edge, third edge or the fourth edge.

4. The package of claim 1 wherein the first end of the first score line is positioned non-adjacent to the first edge, the second edge, the third edge or the fourth edge.

5. The package of claim 1 wherein the second end of the first score line is positioned non-adjacent to the first edge, the second edge, third edge or the fourth edge.

6. The package of claim 1 wherein the first panel multilayer film further comprises an intermediate layer positioned between the exterior layer and the interior layer.

7. The package of claim 6 wherein the intermediate layer comprises a release agent positioned between the exterior layer and the interior layer in the first region.

8. The package of claim 7 wherein the first panel multilayer film further comprises a pattern connecting layer positioned between the release agent and the interior layer in the first region, wherein the pattern connecting layer remains attached to the interior layer when the exterior layer and the interior layer are separated and wherein the exterior layer and the interior layer are adapted to be reattached in the first region.

9. The package of claim 1 wherein the first panel multilayer film further comprises a flood connecting layer positioned between the exterior layer and the interior layer.

10. The package of claim 1 wherein the third edge comprises a gusset member and the package is a stand-up pouch.

11. The package of claim 1 where in each of the first edge, the second edge and the fourth edge comprises a heat seal.

12. The package of claim 1 wherein the first score line has a shape that is arcuate, rectilinear, angled with lines of even length or lines of uneven length, inverted v-shaped, w-shaped or inverted w-shaped.

13. The package of claim 1 wherein the adhesive-free portion is a pour spout.

14. The package of claim 13 wherein the pour spout is non-folded.

15. A package comprising a first panel, a second panel, a firs edge connecting the first panel and the second panel, a second edge connecting the first panel and the second panel, a third edge connecting the first panel and the second panel and a fourth edge connecting the first panel and the second panel;
wherein the first panel comprises a multilayer film comprising
an exterior layer having a nonlinear first score line having a first end and a second end, wherein each of the first end and the second end is positioned in the first panel,
an interior layer having a linear second score line having a first point spaced apart from a second point,
an intermediate layer comprising a release agent positioned between the exterior layer and the interior layer in a first region between the first score line and the second score line,
a pattern connecting layer positioned between the intermediate layer and the interior layer in the first region, and
a flood connecting layer positioned between the pattern connecting layer and the interior layer in the first region,
wherein the exterior layer and the interior layer are adapted to be separated in the first region, wherein the first score line and the second score line are positioned non-parallel in a plane of the package such that the first score line intersects the second score line at each of the first point and the second point to form an opening in the package at the second score line when the exterior layer and the interior layer are separated, wherein the exterior layer forms an adhesive-free portion that remains hingedly and integrally attached to a remainder of the exterior layer at the opening, wherein the adhesive-free portion is positioned between the opening and the third edge when the exterior layer and the interior layer are separated, wherein the pattern connecting layer remains attached to the interior layer when the exterior layer and the interior layer are separated and wherein the exterior layer and the interior layer are adapted to be reattached in the first region; and
wherein the second panel is a flexible film and wherein the third edge comprises:
a) a gusset member formed or plowed in a fold between and connecting the first panel and the second panel, or
b) a gusset member inserted and sealed between and connecting the t panel and the second panel.

16. The package of claim 15 wherein the first end of the first score line is positioned adjacent to the first edge, the second edge, the third edge or the fourth edge.

17. The package of claim 15 wherein the second end of the first core line is positioned adjacent to the first edge, the second edge, third edge or the fourth edge.

18. The package of claim 15 wherein the first end of the first score line is positioned non-adjacent to the first edge, the second edge, the third edge or the fourth edge.

19. The package of claim 15 wherein the second end of the first score line is positioned non-adjacent to the first edge, the second edge, third edge or the fourth edge.

20. The package of claim 15 wherein the third edge comprises a gusset member and the package is a stand-up pouch.

21. The package of claim 15 wherein each of the first edge, the second edge and the fourth edge comprises a heat seal.

22. The package of claim 15 wherein the first score line has a shape that is arcuate, rectilinear, angled with lines of even length or lines of uneven length, inverted v-shaped, w-shaped or inverted w-shaped.

23. The package of claim 15 wherein the adhesive-free portion is a pour spout.

24. The package of claim 23 wherein the pour spout is non-folded.

* * * * *

UNITED STATES PATENT AND TRADEMARK OFFICE
CERTIFICATE OF CORRECTION

PATENT NO. : 10,071,841 B2
APPLICATION NO. : 14/902036
DATED : September 11, 2018
INVENTOR(S) : Jordan R. Tracy et al.

It is certified that error appears in the above-identified patent and that said Letters Patent is hereby corrected as shown below:

On the Title Page

In Column 2, under "FOREIGN PATENT DOCUMENTS", Line 1, delete "CA 2270572 A1* 4/1999".

In Column 2, under "ABSTRACT", Line 3, delete "Sine" and insert -- line --, therefor.

In Column 2, under "ABSTRACT", Line 5, delete "fine" and insert -- line --, therefor.

On page 2, in Column 1, under "U.S. PATENT DOCUMENTS", Line 17, after "Hanson" insert -- et al. --.

In the Specification

In Column 1, Line 11, delete "recluse" and insert -- reclose --, therefor.

In Column 1, Line 16, delete "se" and insert -- seal --, therefor.

In Column 1, Line 67, delete "pout" and insert -- pour --, therefor.

In Column 2, Line 21, delete "ting" and insert -- connecting --, therefor.

In Column 3, Line 33, after "FIG. 1" insert -- . --.

In Column 3, Line 41, delete "FIG. taken" and insert -- FIG. 1, taken --, therefor.

In Column 3, Line 45, after "FIG. 14" insert -- . --.

In Column 3, Line 65, delete "forms," and insert -- forms. --, therefor.

Signed and Sealed this
Twenty-sixth Day of November, 2019

Andrei Iancu
*Director of the United States Patent and Trademark Office*

CERTIFICATE OF CORRECTION (continued)
U.S. Pat. No. 10,071,841 B2

In Column 4, Line 32, delete "layers," and insert -- layers. --, therefor.

In Column 5, Line 3, after "join" insert -- or --.

In Column 5, Line 27, delete "corning" and insert -- coming --, therefor.

In Column 5, Line 59, delete "r able," and insert -- or able --, therefor.

In Column 6, Line 36, delete "baffler" and insert -- barrier --, therefor.

In Column 6, Line 37, after "moisture" insert -- (e.g., --.

In Column 6, Line 45, delete "vinylide" and insert -- vinylidene --, therefor.

In Column 6, Line 52, delete "$C_2)_m$" and insert -- $CH_2)_m$ --, therefor.

In Column 7, Line 49, delete "polymers" and insert -- copolymers --, therefor.

In Column 8, Line 33, delete "alpha olefin" and insert -- alpha-olefin --, therefor.

In Column 8, Line 36, after "example," delete "to".

In Column 8, Line 44, after "complexed" insert -- to --.

In Column 9, Line 39, delete "add," and insert -- acid, --, therefor.

In Column 9, Line 56, delete "polyhydroxyalkonates" and insert -- polyhydroxyalkanoates --, therefor.

In Column 10, Line 5, delete "polyamicle" and insert -- polyamide --, therefor.

In Column 10, Line 16, delete "polyundecanolactarn" and insert -- polyundecanolactam --, therefor.

In Column 10, Line 18, delete "adipamidle)," and insert -- adipamide), --, therefor.

In Column 10, Lines 36-37, delete "4,1, nylon 6,1, nylon 6,6/61" and insert -- 4,I, nylon 6,I, nylon 6,6/6I --, therefor.

In Column 10, Line 39, delete "61/6T copolymer, nylon 6T/61" and insert -- 6I/6T copolymer, nylon 6T/6I --, therefor.

In Column 10, Lines 41-42, delete "(polycloclecarnethylene" and insert -- "(polydodecamethylene --, therefor.

In Column 10, Line 48, delete "procedure" and insert -- procedures --, therefor.

In Column 11, Line 13, delete "annealing heat-setting" and insert -- annealing/heat-setting --, therefor.

CERTIFICATE OF CORRECTION (continued)
U.S. Pat. No. 10,071,841 B2

In Column 11, Line 44, delete "a s of" and insert -- streams of --, therefor.

In Column 13, Line 1, after "expand" delete "d" and insert -- and --, therefor.

In Column 13, Line 65, delete "vv-shaped," and insert -- w-shaped, --, therefor.

In Column 14, Line 53, delete "14," and insert -- 14. --, therefor.

In Column 15, Line 7, after "point" delete "s" and insert -- as --, therefor.

In Column 15, Line 51, after "above" insert -- . --.

In Column 16, Line 59, delete "52," and insert -- 52. --, therefor.

In Column 16, Line 61, after "point" delete "s" and insert -- as --, therefor.

In Column 16, Line 63, delete "alter ate second e Id" and insert -- alternate second end --, therefor; delete "(first" and insert -- in first --, therefor.

In Column 17, Lines 5, delete "sc e" and insert -- score --, therefor.

In Column 17, Lines 6, delete "sc e" and insert -- score --, therefor.

In Column 17, Lines 10, delete "in" and insert -- In --, therefor.

In Column 17, Line 12, delete "he" and insert -- the --, therefor.

In Column 17, Line 61, delete "form n" and insert -- forms an --, therefor.

In Column 18, Line 52, delete "n ay" and insert -- may --, therefor.

In Column 19, Line 14, delete "HG." and insert -- FIG. --, therefor.

In Column 19, Line 50, delete "in" and insert -- In --, therefor.

In Column 20, Lines 32-33, delete "1, First" and insert -- 1. First. --, therefor.

In Column 21, Line 28, delete "polymers" and insert -- copolymers --, therefor.

In Column 21, Line 46, delete "alpha olefin" and insert -- alpha-olefin --, therefor.

In Column 21, Line 54, delete "1.0 g/1 0 min" and insert -- 1.0 g/10 min --, therefor.

In Column 21, Line 66, delete "in" and insert -- In --, therefor.

In Column 22, Line 8, after "of" insert -- a --.

CERTIFICATE OF CORRECTION (continued)
U.S. Pat. No. 10,071,841 B2

In Column 22, Line 11, delete "C/2.16" and insert -- C./2.16 --, therefor.

In Column 22, Line 20, delete "RMW/94546" and insert -- RMW94546 --, therefor.

In Column 22, Line 29, delete "haying" and insert -- having --, therefor.

In Column 22, Line 34, delete "26" and insert -- 28 --, therefor.

In Column 23, Line 17, after "second" delete "e" and insert -- score --, therefor.

In Column 23, Line 23, delete "in" and insert -- In --, therefor.

In Column 24, Line 2, delete "carboyxlated" and insert -- carboxylated --, therefor.

In Column 24, Line 31, delete "First" and insert -- first --, therefor.

In Column 24, Line 59, delete "cross-section" and insert -- cross-sectional --, therefor.

In Column 26, Line 28, after "provides" insert -- a --.

In Column 26, Line 44, after "package" delete "a d" and insert -- and --, therefor.

In Column 27, Line 36, delete "gent" and insert -- agent --, therefor.

In Column 27, Line 37, after "via" insert -- a --.

In Column 27, Line 55, after "805." start a new paragraph.

In Column 27, Line 64, delete "of" and insert -- for --, therefor.

In Column 29, Line 18, after "slit into" insert -- a --.

In Column 29, Line 28, delete "vie" and insert -- view --, therefor.

In Column 29, Line 44, after "815" delete ",o" and insert -- to --, therefor.

In the Claims

In Column 30, Line 25, in Claim 1, delete "flat" and insert -- first --, therefor.

In Column 31, Line 21, in Claim 11, delete "where in" and insert -- wherein --, therefor.

In Column 31, Line 32, in Claim 15, delete "firs" and insert -- first --, therefor.

CERTIFICATE OF CORRECTION (continued)
U.S. Pat. No. 10,071,841 B2

In Column 32, Line 25, in Claim 15, after "the" delete "t" and insert -- first --, therefor.

In Column 32, Line 30, in Claim 17, delete "core" and insert -- score --, therefor.